US012280015B2

(12) United States Patent
Rouse et al.

(10) Patent No.: US 12,280,015 B2
(45) Date of Patent: Apr. 22, 2025

(54) REFILL AND DOSAGE MANAGEMENT DEVICES AND ASSOCIATED SYSTEMS AND METHODS FOR USE WITH COMPUTERIZED ORAL PRESCRIPTION ADMINISTRATION DEVICES

(71) Applicant: BERKSHIRE BIOMEDICAL, LLC, Dallas, TX (US)

(72) Inventors: Thomas M. Rouse, Dallas, TX (US); Susan B. Owen, Dallas, TX (US); Christy Corey, Fishers, IN (US)

(73) Assignee: Berkshire Biomedical Corporation, Dallas, TX (US)

( * ) Notice: Subject to any disclaimer, the term of this patent is extended or adjusted under 35 U.S.C. 154(b) by 0 days.

(21) Appl. No.: 16/948,638

(22) Filed: Sep. 25, 2020

(65) Prior Publication Data

US 2021/0000692 A1 Jan. 7, 2021

Related U.S. Application Data

(63) Continuation of application No. 16/001,498, filed on Jun. 6, 2018, now Pat. No. 10,792,226.

(Continued)

(51) Int. Cl.

*A61J 7/04* (2006.01)
*A61J 7/00* (2006.01)
*A61J 1/05* (2006.01)

(52) U.S. Cl.

CPC ........... *A61J 7/0481* (2013.01); *A61J 7/0053* (2013.01); *A61J 7/0418* (2015.05); *A61J 7/0454* (2015.05);

(Continued)

(58) Field of Classification Search

CPC ........ A61M 2205/52; A61M 2205/609; A61M 2205/13; A61M 2205/332;

(Continued)

(56) References Cited

U.S. PATENT DOCUMENTS

| | | | |
|---|---|---|---|
| 3,840,992 | A | 10/1974 | English |
| 4,116,195 | A | 9/1978 | James |

(Continued)

FOREIGN PATENT DOCUMENTS

| | | |
|---|---|---|
| CN | 1997421 | 7/2007 |
| CN | 203417402 | 2/2014 |

(Continued)

OTHER PUBLICATIONS

Chinese Office Action, Application No. 201880013266.6, dated Dec. 18, 2020, 8 pages.

(Continued)

*Primary Examiner* — Joel M Attey
*Assistant Examiner* — Antarius S Daniel
(74) *Attorney, Agent, or Firm* — Haynes and Boone,, LLP

(57) ABSTRACT

Refill and dosage management devices and associated systems and methods for use with computerized oral prescription administration (COPA) devices are provided. In some examples, an apparatus includes a dispensing unit configured to dispense a substance into a reservoir of a mouthpiece of an intended user; and an identification unit configured to, based on a communication from the mouthpiece, determine an identity of the intended user when the mouthpiece of the intended user is coupled to a housing, the housing sized and shaped to receive at least a portion of the mouthpiece.

11 Claims, 11 Drawing Sheets

Related U.S. Application Data

(60) Provisional application No. 62/516,307, filed on Jun. 7, 2017.

(52) U.S. Cl.
CPC .................. *A61J 7/049* (2015.05); *A61J 1/05* (2013.01); *A61J 7/0092* (2013.01); *A61J 2200/30* (2013.01); *A61J 2200/70* (2013.01)

(58) Field of Classification Search
CPC ...... A61M 2205/3303; A61M 2205/60; A61M 2205/6009; A61M 2205/6036; A61M 2205/6045; A61M 5/204; A61M 2005/3114; A61M 31/00; A61M 2209/045; A61M 2210/0625; A61M 2210/0631; A61M 2210/0637; A61C 19/063; A61C 19/066; A61C 17/227; A61C 17/228; A61J 7/0418; A61J 7/0427; A61J 7/0454; A61J 7/049; A61J 7/0053; A61J 7/0092
See application file for complete search history.

(56) References Cited

U.S. PATENT DOCUMENTS

| | | | |
|---|---|---|---|
| 4,237,884 | A | 12/1980 | Erickson et al. |
| 4,353,365 | A | 10/1982 | Hallworth et al. |
| 4,428,502 | A | 1/1984 | Veltri |
| 4,474,308 | A | 10/1984 | Bergeron |
| 4,717,042 | A | 1/1988 | McLaughlin |
| 4,784,288 | A | 11/1988 | Jennings |
| 5,159,581 | A | 10/1992 | Agans |
| 5,583,831 | A | 12/1996 | Churchill et al. |
| 5,791,515 | A | 8/1998 | Khan et al. |
| 5,852,590 | A | 12/1998 | de la Huerga |
| H1782 | H | 2/1999 | Wicks et al. |
| 5,881,721 | A | 3/1999 | Bunce et al. |
| 5,947,329 | A | 9/1999 | Bailey |
| 5,960,085 | A | 9/1999 | de la Huerga |
| 5,971,594 | A | 10/1999 | Sahai et al. |
| 5,990,782 | A | 11/1999 | Lee |
| 6,018,289 | A | 1/2000 | Sekura et al. |
| 6,032,155 | A | 2/2000 | de la Huerga |
| 6,082,363 | A | 7/2000 | Washburn |
| 6,089,864 | A | 7/2000 | Buckner et al. |
| 6,112,942 | A | 9/2000 | Deacon |
| 6,119,684 | A | 9/2000 | Nohl et al. |
| 6,145,697 | A | 11/2000 | Gudish |
| 6,163,736 | A | 12/2000 | Halfacre |
| 6,198,383 | B1 | 3/2001 | Sekura et al. |
| 6,259,654 | B1 | 7/2001 | de la Huerga |
| 6,304,797 | B1 | 10/2001 | Shusterman |
| 6,332,100 | B1 | 12/2001 | Sahai et al. |
| 6,335,907 | B1 | 1/2002 | Momich et al. |
| 6,408,330 | B1 | 6/2002 | DeLaHuerga |
| 6,431,399 | B2 | 8/2002 | Gabel et al. |
| 6,529,446 | B1 | 3/2003 | de la Huerga |
| 6,604,650 | B2 | 8/2003 | Sagar |
| 6,611,733 | B1 | 8/2003 | De La Huerga |
| 6,702,146 | B2 | 3/2004 | Varis |
| 6,779,024 | B2 | 8/2004 | DeLaHuerga |
| 6,834,775 | B1 | 12/2004 | Collins |
| 6,958,691 | B1 | 10/2005 | Anderson et al. |
| 6,988,634 | B2 | 1/2006 | Varis |
| 7,006,894 | B2 | 2/2006 | de la Huerga |
| 7,042,807 | B1 | 5/2006 | Breen |
| 7,048,141 | B2 | 5/2006 | Abdulhay et al. |
| 7,061,831 | B2 | 6/2006 | De La Huerga |
| 7,072,738 | B2 | 7/2006 | Bonney et al. |
| 7,073,685 | B1 | 7/2006 | Giraud et al. |
| 7,100,797 | B2 | 9/2006 | Kahn et al. |
| 7,104,417 | B2 | 9/2006 | Hilliard |
| 7,128,240 | B1 | 10/2006 | Oesch |
| 7,147,127 | B2 | 12/2006 | Lepke et al. |
| 7,178,688 | B2 | 2/2007 | Naufel et al. |
| 7,182,955 | B2 | 2/2007 | Hart et al. |
| 7,213,721 | B2 | 5/2007 | Abdulhay et al. |
| 7,216,802 | B1 | 5/2007 | De La Huerga |
| 7,269,476 | B2 | 9/2007 | Ratnakar |
| 7,295,890 | B2 | 11/2007 | Jean-Pierre |
| 7,302,311 | B2 | 11/2007 | Varis |
| 7,328,859 | B2 | 2/2008 | Hornsby et al. |
| 7,359,765 | B2 | 4/2008 | Varvarelis et al. |
| 7,366,675 | B1 | 4/2008 | Walker et al. |
| 7,392,918 | B2 | 7/2008 | Holloway et al. |
| 7,404,500 | B2 | 7/2008 | Marteau et al. |
| 7,648,093 | B2 | 1/2010 | Kroger |
| 7,711,449 | B2 | 5/2010 | Abdulhay et al. |
| 7,715,277 | B2 | 5/2010 | de la Huerga |
| 7,719,927 | B1 | 5/2010 | Robinson et al. |
| 7,801,745 | B2 | 9/2010 | Walker et al. |
| 7,810,673 | B2 | 10/2010 | Lancesseur et al. |
| 7,831,336 | B2 | 11/2010 | Gumpert |
| 7,844,361 | B2 | 11/2010 | Jean-Pierre |
| 7,885,725 | B2 | 2/2011 | Dunn |
| 7,941,534 | B2 | 5/2011 | de la Huerga |
| 7,978,564 | B2 | 7/2011 | De La Huerga |
| 7,988,016 | B2 | 8/2011 | Klein et al. |
| 7,996,106 | B2 | 8/2011 | Ervin |
| 8,019,471 | B2 | 9/2011 | Bogash et al. |
| 8,028,856 | B2 | 10/2011 | Erdelyi et al. |
| 8,029,538 | B2 | 10/2011 | Burroughs et al. |
| 8,033,422 | B2 | 10/2011 | Estrada |
| 8,055,509 | B1 | 11/2011 | Walker et al. |
| 8,062,248 | B2 | 11/2011 | Kindel |
| 8,069,056 | B2 | 11/2011 | Walker et al. |
| 8,135,497 | B2 | 3/2012 | Joslyn |
| 8,195,330 | B2 | 6/2012 | Coe |
| 8,212,677 | B2 | 7/2012 | Ferguson |
| 8,226,978 | B2 | 7/2012 | Palmer et al. |
| 8,269,613 | B2 | 9/2012 | Lazar |
| 8,279,076 | B2 | 10/2012 | Johnson |
| 8,284,068 | B2 | 10/2012 | Johnson |
| 8,319,613 | B2 | 11/2012 | Lazar |
| 8,326,455 | B2 | 12/2012 | Dunn |
| 8,357,114 | B2 | 1/2013 | Poutiatine et al. |
| 8,391,104 | B2 | 3/2013 | de la Huerga |
| 8,392,020 | B2 | 3/2013 | Terzini |
| 8,417,378 | B2 | 4/2013 | Joslyn |
| 8,483,872 | B2 | 7/2013 | Ratnakar |
| 8,499,966 | B2 | 8/2013 | Palmer et al. |
| 8,502,671 | B2 | 8/2013 | Marcovici |
| 8,502,692 | B2 | 8/2013 | Johnson |
| 8,511,478 | B2 | 8/2013 | Terzini |
| 8,548,623 | B2 | 10/2013 | Poutiatine et al. |
| 8,552,868 | B1 | 10/2013 | Ferguson |
| 8,574,189 | B2 | 11/2013 | Poutiatine et al. |
| 8,600,548 | B2 | 12/2013 | Bossi et al. |
| 8,636,172 | B2 | 1/2014 | Dunn |
| 8,666,539 | B2 | 3/2014 | Ervin |
| 8,666,543 | B2 | 3/2014 | MacVittie et al. |
| 8,669,863 | B2 | 3/2014 | Alhuwaishel |
| 8,670,865 | B2 | 3/2014 | Coe |
| 8,725,291 | B2 | 5/2014 | Czaja et al. |
| 8,727,180 | B2 | 5/2014 | Zonana et al. |
| 8,734,061 | B2 | 5/2014 | Terzini |
| 8,753,308 | B2 | 6/2014 | Palmer et al. |
| 8,778,393 | B2 | 7/2014 | Palmer et al. |
| 8,807,131 | B1 | 8/2014 | Tunnell et al. |
| 8,821,454 | B2 | 9/2014 | Kriesel et al. |
| 8,854,225 | B2 | 10/2014 | Johnson |
| 8,874,260 | B2 | 10/2014 | Saltsov |
| 8,905,964 | B2 | 12/2014 | Poutiatine et al. |
| 8,922,367 | B2 | 12/2014 | Denny et al. |
| 8,973,338 | B2 | 3/2015 | Terzini |
| 8,976,036 | B2 | 3/2015 | Johnson |
| 8,985,388 | B2 | 3/2015 | Ratnakar |
| 9,010,584 | B2 | 4/2015 | Law et al. |
| 9,014,847 | B2 | 4/2015 | Dunn |
| 9,019,097 | B2 | 4/2015 | Choi et al. |
| 9,037,291 | B2 | 5/2015 | Terzini |
| 9,043,015 | B2 | 5/2015 | Ratnakar |
| 9,066,847 | B2 | 6/2015 | Poutiatine et al. |

(56) References Cited

U.S. PATENT DOCUMENTS

| | | | |
|---|---|---|---|
| 9,066,849 | B2 | 6/2015 | Fung et al. |
| 9,155,682 | B2 | 10/2015 | Boyd |
| 9,161,885 | B1 | 10/2015 | Zhou |
| 9,211,559 | B2 | 12/2015 | Law et al. |
| 9,218,458 | B2 | 12/2015 | Baarman et al. |
| 9,235,689 | B2 | 1/2016 | Ervin |
| 9,283,363 | B1 | 3/2016 | Scorzelli et al. |
| 9,289,583 | B2 | 3/2016 | Palmer et al. |
| 9,346,068 | B2 | 5/2016 | Knight et al. |
| 9,352,108 | B1 * | 5/2016 | Reed ................. A61M 15/0091 |
| 9,361,772 | B2 | 6/2016 | Johnson |
| 9,381,139 | B2 | 7/2016 | Fung et al. |
| 9,414,599 | B2 | 8/2016 | Leonardi |
| 9,418,207 | B1 | 8/2016 | Patton et al. |
| 9,436,298 | B2 | 9/2016 | Draper et al. |
| 9,439,835 | B2 | 9/2016 | DiMartino et al. |
| 9,566,402 | B2 | 2/2017 | Djupesland |
| 9,636,195 | B2 | 5/2017 | Wolpo |
| 9,731,103 | B1 | 8/2017 | Rouse et al. |
| 9,795,296 | B2 | 10/2017 | Imran |
| 9,839,500 | B2 * | 12/2017 | Flyash ................. A61C 19/066 |
| 9,968,777 | B1 | 5/2018 | Demarest et al. |
| 2001/0009398 | A1 | 7/2001 | Sekura et al. |
| 2001/0022758 | A1 | 9/2001 | Howard |
| 2003/0174554 | A1 | 9/2003 | Dunstone et al. |
| 2004/0008123 | A1 | 1/2004 | Carrender et al. |
| 2004/0117062 | A1 | 6/2004 | Bonney et al. |
| 2004/0158194 | A1 | 8/2004 | Wolff et al. |
| 2004/0158349 | A1 | 8/2004 | Bonney et al. |
| 2005/0202363 | A1 | 9/2005 | Osterwalder |
| 2005/0230409 | A1 | 10/2005 | von Schuckmann |
| 2006/0138162 | A1 | 6/2006 | Anderson et al. |
| 2006/0166157 | A1 | 7/2006 | Rahman et al. |
| 2006/0184271 | A1 | 8/2006 | Loveless |
| 2006/0213921 | A1 | 9/2006 | Abdulhay et al. |
| 2006/0218015 | A1 | 9/2006 | Walker et al. |
| 2006/0234189 | A1 | 10/2006 | Duret |
| 2006/0282010 | A1 | 12/2006 | Martin et al. |
| 2007/0075842 | A1 | 4/2007 | Russell et al. |
| 2007/0093932 | A1 | 4/2007 | Abdulhay et al. |
| 2007/0009856 | A1 | 5/2007 | Ko |
| 2007/0095851 | A1 | 5/2007 | Anderson et al. |
| 2007/0135790 | A1 | 6/2007 | Auerbach |
| 2007/0138195 | A1 | 6/2007 | Anderson et al. |
| 2007/0145065 | A1 | 6/2007 | Anderson et al. |
| 2007/0170199 | A1 | 7/2007 | York |
| 2007/0228065 | A1 | 10/2007 | Anderson et al. |
| 2007/0261985 | A1 | 11/2007 | Allen |
| 2007/0271001 | A1 | 11/2007 | Ratnakar |
| 2008/0008978 | A1 | 1/2008 | Conrad et al. |
| 2008/0017658 | A1 | 1/2008 | Wright |
| 2008/0027291 | A1 | 1/2008 | Williams-Hartman |
| 2008/0027579 | A1 | 1/2008 | van der Hoop |
| 2008/0054008 | A1 | 3/2008 | Wright |
| 2008/0059228 | A1 | 3/2008 | Bossi et al. |
| 2008/0060148 | A1 | 3/2008 | Pinyayev |
| 2008/0140250 | A1 | 6/2008 | Dave |
| 2008/0227046 | A1 | 9/2008 | Lowe et al. |
| 2008/0251530 | A1 | 10/2008 | Holloway et al. |
| 2008/0283542 | A1 | 11/2008 | Lanka et al. |
| 2009/0127157 | A1 | 5/2009 | Costa et al. |
| 2009/0208898 | A1 | 8/2009 | Kaplan |
| 2009/0210032 | A1 | 8/2009 | Beiski et al. |
| 2009/0223994 | A1 | 9/2009 | Getz |
| 2009/0272766 | A1 | 11/2009 | Liable |
| 2009/0277461 | A1 | 11/2009 | Gallagher, Jr. et al. |
| 2009/0277921 | A1 | 11/2009 | Angelucci et al. |
| 2010/0006589 | A1 | 1/2010 | Klein |
| 2010/0096399 | A1 | 4/2010 | Ratnakar |
| 2010/0100237 | A1 | 4/2010 | Ratnakar |
| 2010/0185456 | A1 | 7/2010 | Kansal |
| 2010/0318218 | A1 | 12/2010 | Muncy, Jr. et al. |
| 2010/0332023 | A1 | 12/2010 | Tripathi et al. |
| 2011/0011883 | A1 | 1/2011 | Nakkouri |
| 2011/0021983 | A1 | 1/2011 | Jurson |
| 2011/0027746 | A1 | 2/2011 | McDonough et al. |
| 2011/0060455 | A1 | 3/2011 | Bogash et al. |
| 2011/0060457 | A1 | 3/2011 | De Vrught et al. |
| 2011/0142554 | A1 | 6/2011 | Terzini |
| 2011/0146835 | A1 | 6/2011 | Terzini |
| 2011/0152757 | A1 | 6/2011 | Beck et al. |
| 2011/0160901 | A1 | 6/2011 | Abrams, Jr. et al. |
| 2011/0202174 | A1 | 8/2011 | Bogash et al. |
| 2011/0259910 | A1 | 10/2011 | Knudsen |
| 2011/0295416 | A1 | 12/2011 | Aquilonius et al. |
| 2011/0307592 | A1 | 12/2011 | de la Huerga |
| 2012/0055948 | A1 | 3/2012 | Leifeld et al. |
| 2012/0160716 | A1 | 6/2012 | Chan et al. |
| 2012/0165975 | A1 | 6/2012 | Yi et al. |
| 2012/0289905 | A1 | 11/2012 | Julian et al. |
| 2013/0025607 | A1 | 1/2013 | Altounian |
| 2013/0088328 | A1 | 4/2013 | DiMartino et al. |
| 2013/0116818 | A1 | 5/2013 | Hamilton |
| 2013/0120115 | A1 | 5/2013 | Valls Chaparro et al. |
| 2013/0165828 | A1 | 6/2013 | Sullivan |
| 2013/0168405 | A1 | 7/2013 | Yuyama et al. |
| 2013/0211270 | A1 | 8/2013 | St. Laurent et al. |
| 2013/0236851 | A1 | 9/2013 | McDonough et al. |
| 2013/0253286 | A1 | 9/2013 | Fridman |
| 2013/0256331 | A1 | 10/2013 | Giraud et al. |
| 2013/0280671 | A1 | 10/2013 | Brawn et al. |
| 2013/0304255 | A1 | 11/2013 | Ratnakar |
| 2013/0306191 | A1 | 11/2013 | Metzmaker et al. |
| 2013/0323673 | A1 | 12/2013 | Hakomori et al. |
| 2013/0345859 | A1 | 12/2013 | Omura et al. |
| 2014/0031975 | A1 | 1/2014 | Poutiatine et al. |
| 2014/0046676 | A1 | 2/2014 | Kibler et al. |
| 2014/0072932 | A1 | 3/2014 | Brawn et al. |
| 2014/0074283 | A1 | 3/2014 | Blackburn |
| 2014/0093836 | A1 | 4/2014 | Wolpo |
| 2014/0114472 | A1 | 4/2014 | Bossi et al. |
| 2014/0195043 | A1 | 7/2014 | Ervin |
| 2014/0203021 | A1 | 7/2014 | Zill |
| 2014/0207278 | A1 | 7/2014 | Czaja et al. |
| 2014/0257051 | A1 | 9/2014 | Cam et al. |
| 2014/0263423 | A1 | 9/2014 | Akdogan et al. |
| 2014/0263425 | A1 | 9/2014 | Akdogan et al. |
| 2014/0267719 | A1 | 9/2014 | Akdogan et al. |
| 2014/0277705 | A1 | 9/2014 | Czaja et al. |
| 2014/0277707 | A1 | 9/2014 | Akdogan et al. |
| 2014/0277710 | A1 | 9/2014 | Akdogan et al. |
| 2014/0278508 | A1 | 9/2014 | Akdogan et al. |
| 2014/0278510 | A1 | 9/2014 | McLean et al. |
| 2014/0303989 | A1 | 10/2014 | Ferguson |
| 2014/0305963 | A1 | 10/2014 | Zonana et al. |
| 2014/0316799 | A1 | 10/2014 | Cosgrove et al. |
| 2014/0324216 | A1 | 10/2014 | Beg et al. |
| 2014/0326744 | A1 | 11/2014 | Ratnakar |
| 2014/0339248 | A1 | 11/2014 | Reddy et al. |
| 2014/0339249 | A1 | 11/2014 | Reddy et al. |
| 2014/0346184 | A1 | 11/2014 | Bae et al. |
| 2014/0346186 | A1 | 11/2014 | Reddy et al. |
| 2014/0350720 | A1 | 11/2014 | Lehmann et al. |
| 2014/0371904 | A1 | 12/2014 | Parviainen |
| 2015/0012131 | A1 | 1/2015 | Saltsov |
| 2015/0021349 | A1 | 1/2015 | Sanders |
| 2015/0038898 | A1 | 2/2015 | Palmer et al. |
| 2015/0044628 | A1 | 2/2015 | Flyash |
| 2015/0048101 | A1 | 2/2015 | Reddy et al. |
| 2015/0072300 | A1 * | 3/2015 | Wolpo ............... A61C 17/0217 433/32 |
| 2015/0072306 | A1 | 3/2015 | Barnard et al. |
| 2015/0076174 | A1 | 3/2015 | Mersmann |
| 2015/0079533 | A1 | 3/2015 | Lowe |
| 2015/0174348 | A1 | 6/2015 | Tunnell et al. |
| 2015/0174349 | A1 | 6/2015 | Tunnell et al. |
| 2015/0191268 | A1 | 7/2015 | Paz |
| 2015/0191294 | A1 | 7/2015 | Paz |
| 2015/0221086 | A1 | 8/2015 | Bertram |
| 2015/0232256 | A1 | 8/2015 | Hoover et al. |
| 2015/0257980 | A1 | 9/2015 | Fung et al. |
| 2015/0259110 | A1 | 9/2015 | Blackburn |
| 2015/0266654 | A1 | 9/2015 | Baarman et al. |
| 2015/0272825 | A1 | 10/2015 | Lim et al. |

(56) References Cited

U.S. PATENT DOCUMENTS

| | | | | |
|---|---|---|---|---|
| 2015/0273165 | A1 | 10/2015 | Hadash | |
| 2015/0291344 | A1 | 10/2015 | Macvittie et al. | |
| 2015/0305671 | A1 | 10/2015 | Yoon et al. | |
| 2015/0317455 | A1 | 11/2015 | Lehmann et al. | |
| 2015/0320643 | A1 | 11/2015 | Zhou | |
| 2015/0328084 | A1 | 11/2015 | Cash | |
| 2015/0342830 | A1 | 12/2015 | Bujalski et al. | |
| 2015/0347713 | A1 | 12/2015 | Seeger | |
| 2015/0359667 | A1 | 12/2015 | Brue | |
| 2016/0001018 | A1* | 1/2016 | Fink | A61M 15/002 128/200.16 |
| 2016/0012249 | A1 | 1/2016 | Keppler | |
| 2016/0015957 | A1* | 1/2016 | Tieck | G01V 3/08 604/533 |
| 2016/0016720 | A2 | 1/2016 | Paz | |
| 2016/0022542 | A1 | 1/2016 | Lehmann et al. | |
| 2016/0029962 | A1 | 2/2016 | Hyde et al. | |
| 2016/0037916 | A1 | 2/2016 | Hermann | |
| 2016/0038377 | A1 | 2/2016 | Tegborg et al. | |
| 2016/0042150 | A1 | 2/2016 | Moloughney | |
| 2016/0066776 | A1 | 3/2016 | Weiss et al. | |
| 2016/0096014 | A1 | 4/2016 | Ajiki et al. | |
| 2016/0107820 | A1 | 4/2016 | Macvittie et al. | |
| 2016/0113747 | A1 | 4/2016 | Almutairi | |
| 2016/0117480 | A1 | 4/2016 | Ervin | |
| 2016/0128906 | A1 | 5/2016 | Baarman et al. | |
| 2016/0132660 | A1 | 5/2016 | Barajas et al. | |
| 2016/0136056 | A1 | 5/2016 | Lapham | |
| 2016/0145031 | A1 | 5/2016 | Reinhold et al. | |
| 2016/0158107 | A1 | 6/2016 | Dvorak et al. | |
| 2016/0166766 | A1 | 6/2016 | Schuster et al. | |
| 2016/0180693 | A1 | 6/2016 | Johnson | |
| 2016/0203292 | A1 | 7/2016 | Kamen et al. | |
| 2016/0211693 | A1 | 7/2016 | Stevens et al. | |
| 2016/0213606 | A1 | 7/2016 | Palmer et al. | |
| 2016/0213843 | A1 | 7/2016 | Despa et al. | |
| 2016/0228333 | A1 | 8/2016 | Bukstein et al. | |
| 2016/0278899 | A1 | 9/2016 | Heller et al. | |
| 2016/0314262 | A1* | 10/2016 | Lauchard | A61M 15/009 |
| 2016/0338810 | A1 | 11/2016 | Schmalhurst et al. | |
| 2016/0366946 | A1 | 12/2016 | Murison et al. | |
| 2017/0027675 | A1 | 2/2017 | Nahshon | |
| 2017/0028178 | A1 | 2/2017 | Skoba | |
| 2017/0197025 | A1 | 7/2017 | Adams et al. | |
| 2017/0265978 | A1 | 9/2017 | Borotto et al. | |
| 2017/0304854 | A1 | 10/2017 | Jacquemart et al. | |
| 2017/0312181 | A1 | 11/2017 | Davis et al. | |
| 2017/0333649 | A1 | 11/2017 | Djupesland | |
| 2018/0184795 | A1* | 7/2018 | Pai | A46B 15/0008 |
| 2018/0353388 | A1 | 12/2018 | Rouse et al. | |
| 2019/0357667 | A1* | 11/2019 | Beckman | A46B 9/045 |

FOREIGN PATENT DOCUMENTS

| | | | |
|---|---|---|---|
| CN | 105263552 | | 1/2016 |
| CN | 105873631 | | 8/2016 |
| DE | 102014114601 | A1 | 4/2016 |
| KR | 101221415 | B1 | 1/2013 |
| WO | WO2004062717 | A1 | 7/2004 |
| WO | WO 2010062675 | | 6/2010 |
| WO | WO2011151056 | A1 | 12/2011 |
| WO | WO 2013062785 | | 5/2013 |
| WO | WO2015150240 | A1 | 10/2015 |
| WO | WO2015172962 | A1 | 11/2015 |
| WO | WO2015181693 | A1 | 12/2015 |
| WO | WO2015196293 | A1 | 12/2015 |
| WO | WO2015196336 | A1 | 12/2015 |
| WO | WO2016064592 | A1 | 4/2016 |
| WO | WO2016064688 | A1 | 4/2016 |
| WO | WO2016064786 | A1 | 4/2016 |
| WO | WO2016064906 | A1 | 4/2016 |
| WO | WO2016064908 | A1 | 4/2016 |
| WO | WO2016116591 | A1 | 7/2016 |
| WO | WO2017064709 | A1 | 4/2017 |
| WO | WO2017218947 | A1 | 12/2017 |
| WO | WO 2019178367 | | 9/2019 |

OTHER PUBLICATIONS

Australian Office Action, Application No. 2019235911, dated Jan. 13, 2021, 6 pages.

International Search Report and Written Opinion, PCT/US2018/013440, dated Mar. 9, 2018, 11 pages.

International Search Report and Written Opinion, PCT/US2019/022287, dated Jul. 16, 2019, 13 pages.

International Search Report and Written Opinion, PCT/US2020/034044, dated Aug. 10, 2020, 22 pages.

European Patent Office, "European Search Report", for Application No. 18739166.9-1132, dated Oct. 1, 2020, 8 pages.

* cited by examiner

REFILL AND DOSAGE MANAGEMENT DEVICES AND ASSOCIATED SYSTEMS AND METHODS FOR USE WITH COMPUTERIZED ORAL PRESCRIPTION ADMINISTRATION DEVICES

CROSS REFERENCE TO RELATED APPLICATIONS

The present application is a continuation application of U.S. patent application Ser. No. 16/001,498, now U.S. Pat. No. 10,792,226, filed Jun. 6, 2018, which claims priority to and the benefit of U.S. Provisional Patent Application No. 62/516,307, filed Jun. 7, 2017, each of which is hereby incorporated by reference in its entirety.

TECHNICAL FIELD

The present disclosure relates generally to refill and dosage management devices and associated systems and methods, and more particularly, to such devices, systems, and methods for use with computerized oral prescription administration (COPA) devices.

INTRODUCTION

The history of pharmacology has produced a continual evolution of routes of administration, pharmaceutical formulations, dosage forms, and dosing devices in a continuing quest towards maximizing the effective benefit and relative costs of prescription medications. Administration of prescribed substances may begin in controlled healthcare settings, for example, at a healthcare facility or by a physician at a patient's home. Early-stage formulations may include liquid forms for parenteral (e.g., into a blood stream) and enteral (e.g., into a gastro-intestine) administration including elixirs, tonics, solutions, suspensions, syrups and eventually injections, intravenous (IVs), and epidurals. The early-stage formulations may be developed to produce advanced forms, for example, via mechanization and formulation research. The early-stage formulations, the advanced forms, and further research and clinical studies such as patient acceptances of the early-stage formulations and/or the advanced forms may contribute to the routes of administration, pharmaceutical formulations, dosage forms, and dosing devices.

As the healthcare treatment transitioned from limited emergency involvement into longer term chronic illness care, higher percentages of the prescribed medication administration shifts from the controlled healthcare settings to patient managed settings. In a patient managed setting, outside the control of a trained healthcare staff, the administration of liquid formulations may be difficult due to non-specific dosing instructions. Dosing based on teaspoon and/or tablespoon measurements may be vague and variable. Dosing cups may have different measurement formats, and thus may cause confusion in a patient managed setting. In addition, dosing cups are often separated from initial prescription bottles, and thus may lead to erroneous administration.

The advancements of mechanical manufacturing systems and pharmacology research enabled patient managed administrations of prescribed substances to shift from liquid formulations to pills (e.g., tablets or capsule-formulations), which may have increased shelf life and allow for patient ease of use, dosing exactness, and production cost reductions. Thus, a majority of oral medications in patient managed settings are now pills. Additionally, there is an increased interest in microparticulate formulations including pellets, granules, micro particles, mini tablets, and the like. However, patients, such as infants, elderly, or impaired patients, that cannot or prefer not to swallow tablets or capsule-formulations may be given enteral oral liquid prescriptions through dosing syringes in patient managed settings. In addition, parenteral liquid formulations are still commonly administered in controlled healthcare settings since the parenteral liquid formulations often have the fastest rate of absorption and the most expedient success in the desired result and can improve localized administration, inventory control, fraud prevention, and administration path audit capability.

Depending on the entity managing the administration of a drug, various forms of the drug may be developed to meet expectations, needs, and challenges of different entities. While there are some exceptions based on effectiveness and toxicity, most pharmaceutical manufacturers may produce multiple formulations of drugs to support different routes of administration and dosing.

There is a growing demand for drug administration in patient controlled or managed settings as consumers increasingly engage in preventative or resultative treatment plans, which involve drug administration in patient controlled settings. For example, outpatient surgeries and/or one-day inpatient surgery stays are increasingly common for significant medical procedures, which may involve subsequent drug administrations at a patient's home. In addition, as the population ages, the demand for prescription management increases. Consumers may take multiple over-the-counter and/or prescribed medicines daily, where the medicines are commonly in the form of pills. Unfortunately, the ease-of-use of pills and the increasing number of consumers engaged in chronic patient managed treatment plans has led to misuse and mismanagement of many drug classes.

For example, pill forms are lightweight, portable, recipient non-specific, difficult for inventory management, don't carry individual identification number, have extensive shelf life, and are inexpensive to produce. Thus, the intakes or usages of pills are difficult to control once outside of healthcare managed environments. In addition, to achieve the economy of scale in the manufacturing process, pill production is scheduled based on maximizing the output of the machines, materials, and/or ingredients available instead of based on future demands. With a few exceptions, a minimal amount of the pills produced are wasted since pills remain active for a long time. Pills proliferate our society and have become conduits to addiction and abuse.

One such patient managed treatment that is highly susceptible to prescription misuse and mismanagement is opioid pain treatment. For example, according to the Food and Drug Administration (FDA), approximately 100 million people in the United States (US) suffer from pain in a given year. About 9 to 12 million of the pain sufferers have chronic or persistent pain, while the remaining pain sufferers have short-term pain from injuries, illnesses, or medical procedures. In 2014, the Centers for Disease Control and Prevention reported that the number of annual opioid prescriptions in the US is about equal to the number of adults in the US population. While pain sufferers should benefit from skillful and appropriate pain management, the misuse or addiction of opioids needs to be controlled. FDA leaders and physicians attempt to address the opioid epidemic by balancing two complementary principles: deal aggressively with opioid misuse and addiction while protecting the well-being of people experiencing acute or chronic pains. However, the pain sufferers in areas where reforms, policies, and restrictions aimed at opioid misuse have been implemented may not experience the balance. Some states have implemented additional known addict or misuser databases that must be checked by providers prior to prescribing. However, physicians may not check the databases prior to prescribing due to the burden of using the systems and/or they may not want to restrict access by true chronic pain sufferers. Other states have implemented reporting and audit trails to track physicians that have prescribed from the opioid family. However, to avoid the additional steps and potentials for audit scrutiny, some physicians may refuse to offer pain management or short-term pain prescriptions, and may refer all cases to pain clinics.

Attempts at improved patient education, enhanced labeling, restrictive prescribing, have led to higher costs for providers, patients, pharmacies, and insurance companies and less overall effectiveness for the patients. In the end, true pain suffers struggle to have access to opioids while opioid misusers continue to manipulate the available avenues for access regardless of the apparent oversights put in place. Policies and plans at various levels have not been successful and are not sufficient to control or reduce the misuse of prescription drugs. Accordingly, improved devices, systems, and methods for drug administration are needed.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure provides refill and dosage management devices and associated systems and methods for use with computerized oral prescription administration (COPA) devices. In this regard, COPA devices may be similar to those described in U.S. patent application Ser. No. 15/406,043, filed Jan. 13, 2017, which is hereby incorporated by reference in its entirety. In order for COPA devices to fit inside an intended user's mouth and function properly, there is a limited volume of space available for storing the substance(s) to be dispensed by the COPA device. Accordingly, in some instances the COPA device may only be able to hold a portion of the intended user's total prescribed dosage amount. For example, the COPA device may be able to hold one dose of a multi-dose daily supply of the substance, hold one or more days' worth of doses of a week's supply of the substance, or hold one or more weeks' worth of a month's supply of the substance, etc. Therefore, in some instances there can be a need to refill the substance (s) in the COPA device for the intended user to complete a prescribed treatment plan.

To this end, the refill and dosage management devices and associated systems and methods of the present disclosure facilitate refilling of the COPA device in accordance with the prescribed treatment plan. In some instances, a docking station for the COPA device may act as the refill and dosage management device. In this regard, the docking station may serve other purposes in addition to the refill and dosage functions such as providing a secure and sanitary storage location for the COPA device, facilitating network communications between the COPA device and a control unit or network, charging the COPA device, etc. The docking station may include a dispensing unit that controls the dispensing of substances from the docking station to the COPA device. For example, the dispensing unit may control the timing and/or volume of the substance(s) dispensed to the COPA device based on the prescribed treatment plan for the intended user and/or the amount of substance(s) currently in the COPA device. In this regard, parameters associated with the dispensing of the substance(s) (e.g., medication type, dosage amount, timing, intended user information, etc.) can be tracked, stored in a COPA management system, and/or communicated throughout the healthcare continuum, including medical personnel, pharmaceutical personnel, patient, authorized caregivers, and/or insurers, such that patient's compliance with a treatment plan can be evaluated and/or the effectiveness of the treatment plan can be evaluated. In this regard, in some instances a comparison of the amount of substance(s) dispensed to the COPA device by the docking station and the amount of the substance(s) dispensed from the COPA device to the intended user can be used to monitor patient compliance. Any notable discrepancies in these amounts can provide an indication of a malfunction in the docking station and/or the COPA device has occurred or an indication that the intended user is not using the system properly to comply with the treatment plan, whether intentionally or accidentally. The docking station and/or COPA management system can send out alerts to participants of the healthcare continuum to serve as notices, reminders, and/or issues based on the dispensed amounts and/or comparisons thereof.

In some embodiments, an apparatus is provided. The apparatus includes a housing having a structure sized and shaped to receive at least a portion of a mouthpiece of an intended user; and a dispensing unit coupled to the housing, the dispensing unit configured to dispense a substance into a reservoir of the mouthpiece. The dispensing unit can be further configured to dispense the substance into the reservoir of the mouthpiece based on dosage instructions for the substance for the intended user. The dosage instructions can include a dosage amount and/or a dosage timing. The dosage instructions for the substance for the intended user can be stored in memory. The dispensing unit can be further configured to store dispensing data associated with the substance being dispensed into the reservoir of the mouthpiece. The dispensing data can include a dispensed amount and/or a dispensed time. The dispensing unit can be further configured to dispense the substance into the reservoir of the mouthpiece based on an amount of the substance in the reservoir of the mouthpiece. The dispensing unit can be configured to receive a communication indicating the amount of the substance in the reservoir of the mouthpiece. The communication indicating the amount of the substance in the reservoir of the mouthpiece can be received from the mouthpiece and/or a central unit in communication with the dispensing unit.

The dispensing unit can include a holding reservoir containing the substance and an actuator in communication with the holding reservoir. The actuator can be configured to move the substance from the holding reservoir of the dispensing unit to the reservoir of the mouthpiece. In some instances, the dispensing unit further includes a second holding reservoir containing a second substance and the actuator is in communication with the second holding reservoir and further configured to move the second substance from the second holding reservoir of the dispensing unit to a second reservoir of the mouthpiece. In other instances, the dispensing unit further includes a second holding reservoir containing a second substance and a second actuator in communication with the second holding reservoir, where the second actuator is configured to move the second substance from the second holding reservoir of the dispensing unit to a second reservoir of the mouthpiece. The second substance can be different than the substance in the other holding reservoir.

The dispensing unit can include an outlet in communication with the actuator that is configured to engage with an inlet of the mouthpiece. The dispensing unit can further include an inlet in communication with the holding reservoir that is configured to receive the substance via the inlet of the dispensing unit. The holding reservoir of the dispensing unit can have a volume equal to or greater than the reservoir of the mouthpiece, including two, three, four, or more times greater than the reservoir of the mouthpiece. In this regard, the holding reservoir of the dispensing unit may be sized to contain multiple doses (e.g., day(s), week(s), month(s), etc.) of the substance based on the intended user's dosage information, while the reservoir of the mouthpiece may be sized to contain one or more doses based on the intended user's dosage information.

The apparatus can further include an identification unit configured to determine an identity of the intended user when the mouthpiece of the intended user is coupled to the structure of the housing. The identification unit can be configured to determine the identity of the intended user based on a communication from the mouthpiece. The identification unit can be configured to determine the identity of the intended user based on a correlation between one or more structural features of the mouthpiece and one or more structural features of the intended user's dentition.

In some embodiments, a method is provided. The method can include receiving, by a docking station, at least a portion of a mouthpiece of an intended user; and dispensing, by a dispensing unit coupled to the docking station, a substance into a reservoir of the mouthpiece. The dispensing can include dispensing the substance into the reservoir of the mouthpiece based on dosage instructions for the substance for the intended user. The dosage instructions can include a dosage amount and/or a dosage timing. The method can also include storing, in memory of the docking station, dispensing data associated with the substance being dispensed into the reservoir of the mouthpiece. The dispensing data can include a dispensed amount and/or a dispensed time. The dispensing can include dispensing the substance into the reservoir of the mouthpiece based on an amount of the substance in the reservoir of the mouthpiece. The method can further include dispensing, by the dispensing unit, a second substance into a second reservoir of the mouthpiece. The second substance can be different than the other dispensed substance. In some embodiments, the method includes engaging an outlet of the dispensing unit with an inlet of the mouthpiece. In some instances, the method further includes determining an identity of the intended user when the mouthpiece of the intended user is coupled to the docking station. The identity of the intended user can be determined based on a communication from the mouthpiece and/or based on a correlation between one or more structural features of the mouthpiece and one or more structural features of the intended user's dentition.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
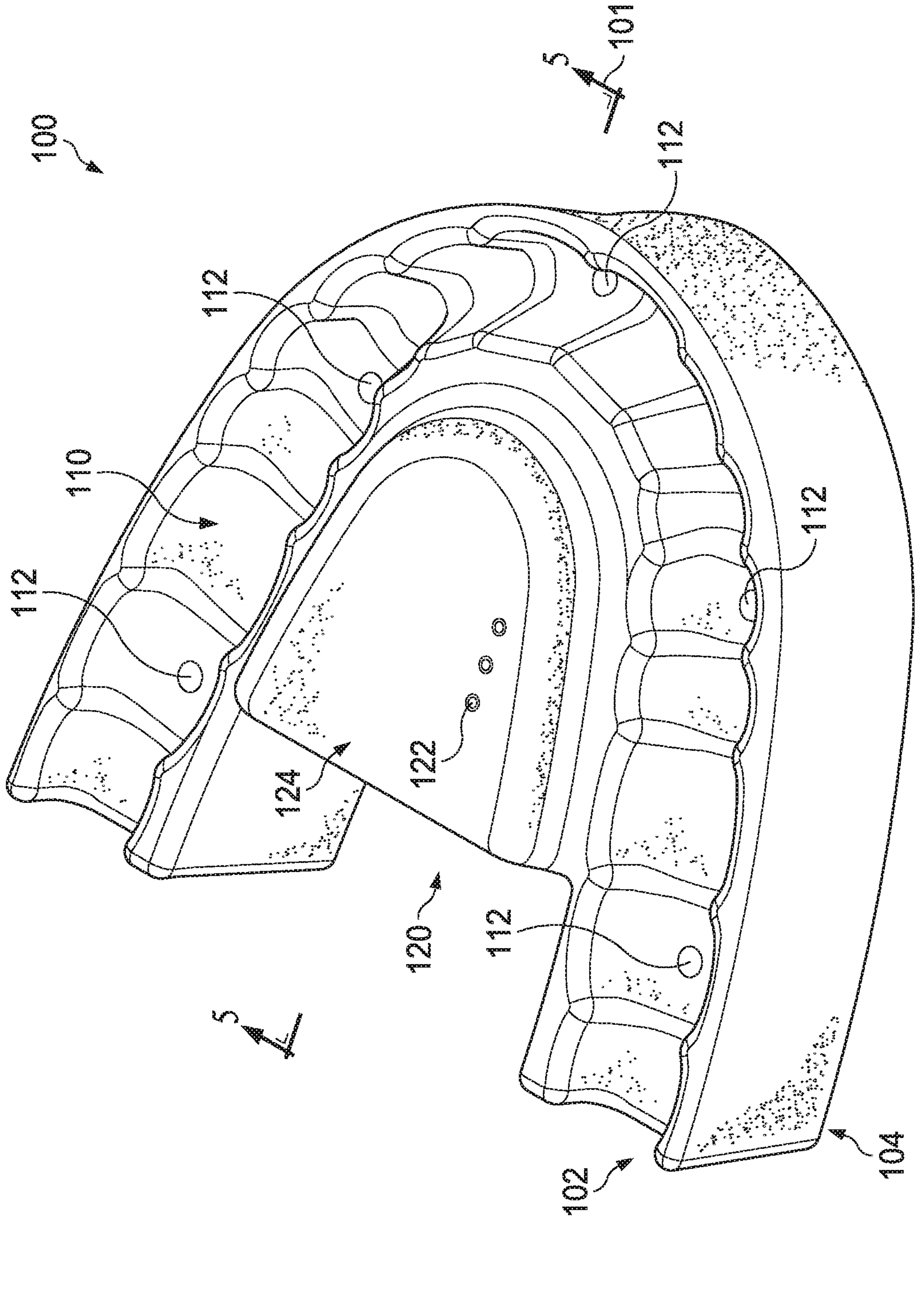
FIG. 1 is a top perspective view of a computerized oral prescription administration (COPA) device according to embodiments of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates.

Embodiments of the present disclosure provide refill and dosage management devices and associated systems and methods for use with computerized oral prescription administration (COPA) devices. In this regard, COPA devices may be similar to those described herein as well as those described in U.S. patent application Ser. No. 15/406,043, filed Jan. 13, 2017, which is hereby incorporated by reference in its entirety.

The disclosed embodiments may provide several benefits. For example, the employment of a docking station with refill and dosage management capabilities can be utilized with the COPA device to ensure that prescribed medications are delivered to the intended recipient. Thus, the disclosed embodiments may avoid misuse and mismanagement of prescription medications. In addition, the disclosed embodiments may allow healthcare providers and insurance companies to better track the administering of the prescribed medications and evaluate the benefits, effects, and/or results of the prescribed medications more accurately. The disclosed embodiments may deliver a precise amount of prescribed medications to a COPA device in accordance with a treatment plan, which may especially benefit patients that are elderly, impaired, or have behavioral issues that may limit their abilities to self-administer prescribed medications. Further, the ability for an intended user to refill a COPA device without the need to revisit a pharmacist, doctor, or other medical professional can improve the user experience and reduce overall costs of administration using the COPA device. In this regard, the volume of medication that can be prescribed and given to an intended user at one time can be greatly increased by using larger holding reservoirs in the docking station, instead of the reservoir(s) of the COPA device that are subject to more stringent size constraints.

Further, the docking station can be utilized to adjust dosages over time (e.g., due to a change in treatment plan or as part of a treatment plan) by controlling the amount and/or timing of the dispensing to the COPA device, monitoring the amount of substance(s) in the COPA device, and/or communicating updated dosing instructions to the COPA device. In this regard, parameters associated with the dispensing of the substance(s) (e.g., medication type, dosage amount, timing, intended user information, etc.) can be tracked, stored in a COPA management system, and/or communicated throughout the healthcare continuum, including medical personnel, pharmaceutical personnel, patient, authorized caregivers, and/or insurers, such that patient's compliance with a treatment plan can be evaluated and/or the effectiveness of the treatment plan can be evaluated. In some embodiments, the docking station can send out alerts to the patient and/or other participants of the healthcare continuum to serve as notices, reminders, and/or issues based on the dispensed amounts and/or patient compliance.

FIG. 1 is a top perspective view of a COPA device 100 according to embodiments of the present disclosure. The COPA device 100 may be used for delivering enteral oral liquid, multiparticulate, and/or other forms of drugs to an intended patient or user with controlled dosing. The COPA device 100 is a mouthpiece including a top side 102 and an opposite bottom side 104. The top side 102 includes a recess 110. The recess 110 is sized and shaped to conform to an intended user's dentition. For example, the recess 110 includes an arrangement for receiving the intended user's upper teeth. The COPA device 100 may be constructed from a biocompatible impression material or polymer.

The recess 110 includes a plurality of sensors 112 positioned at various locations within the recess 110. In some embodiments, the sensors 112 may be pressure sensors or optical position sensors. For example, the sensors 112 may be embedded at locations in contact with crevices, nooks, and gum lines of the user. When the user closes his or her mouth around the COPA device 100 using normal or force bite, the sensors 112 can determine whether the user's dentition is positioned within the recess 110. In some embodiments, the sensors 112 may be housed on one or more agile or flexible filament strands embedded within the recess 110. For example, each filament strand may be coupled between two and twenty sensors 112 or any suitable number of sensors 112. In some embodiments, the sensors 112 may be formed and distributed on a meshed structure embedded within the recess 110. The meshed structure may include any suitable number of sensors 112. The sensors 112 on the meshed structure or the filament strand may allow a pressure profile to be created when the user closes his or her mouth on the COPA device 100. In an embodiment, the sensors 112 may monitor and take position and/or pressure measurements when the user closes his or her mouth. The position and/or pressure measurements may be compared to pre-determined data of the user's dentition as a form of verification to identify an intended recipient of a prescribed substance, as described in greater detail herein.

The COPA device 100 further includes a sealed prescription dispensing unit 120. The sealed prescription dispensing unit 120 may be positioned at the top center of the COPA device 100. The sealed prescription dispensing unit 120 may include a sealed sleeve 124 and a plurality of access ports 122 extending from a top side of the sealed sleeve 124 into the prescription dispensing unit 120. The access ports 122 may be configured to receive prescribed substances. For example, a clinician or pharmacy technician may fill prescribed substances into the prescription dispensing unit 120 via the access ports. The prescribed substances may include formulations in various forms, such as liquid and/or multiparticulate. The prescription dispensing unit 120 may include other components, such as a processor, chambers, flow channels, actuators (e.g., micro-pumps), and exit valves, as described in greater detail herein.

The COPA device 100 may provide patient identification functionalities via the patient's teeth imprint in the recess 110. For example, each individual has a unique dental imprint. While there are certain patterns for the ages at which certain teeth may erupt, mature, and be replaced with permanent teeth and for alignment of teeth types, the setting, size, angle, distance between certain points within a patient's mouth, and the resulting bite are different for different patients. In addition, damaged teeth, missing teeth, filled teeth, capped teeth, and prosthetics such as crowns, bridges, partial, and full dentures further the identifying nature or uniqueness of the mouths of different individuals. Thus, the use of the COPA device 100 with the dentition imprint can be effective in identifying a particular individual. The COPA device 100 may provide further patient identification functionalities via various patient verification mechanisms implemented by a processor coupled to the mouthpiece (e.g., embedded within the sealed prescription dispensing unit 120), as described in greater detail herein.

The COPA device 100 further provides controlled prescription administration functionalities via the sealed prescription dispensing unit 120. For example, the processor may be in communication with the sensors 112 and configured to determine whether the COPA device 100 is correctly positioned within the intended user's mouth. Upon detecting a correct position, the processor may control the components within the sealed prescription dispensing unit 120 to release or deliver an exact dosage of the prescribed substances into the intended user's mouth, as described in greater detail herein.

Figure 2:
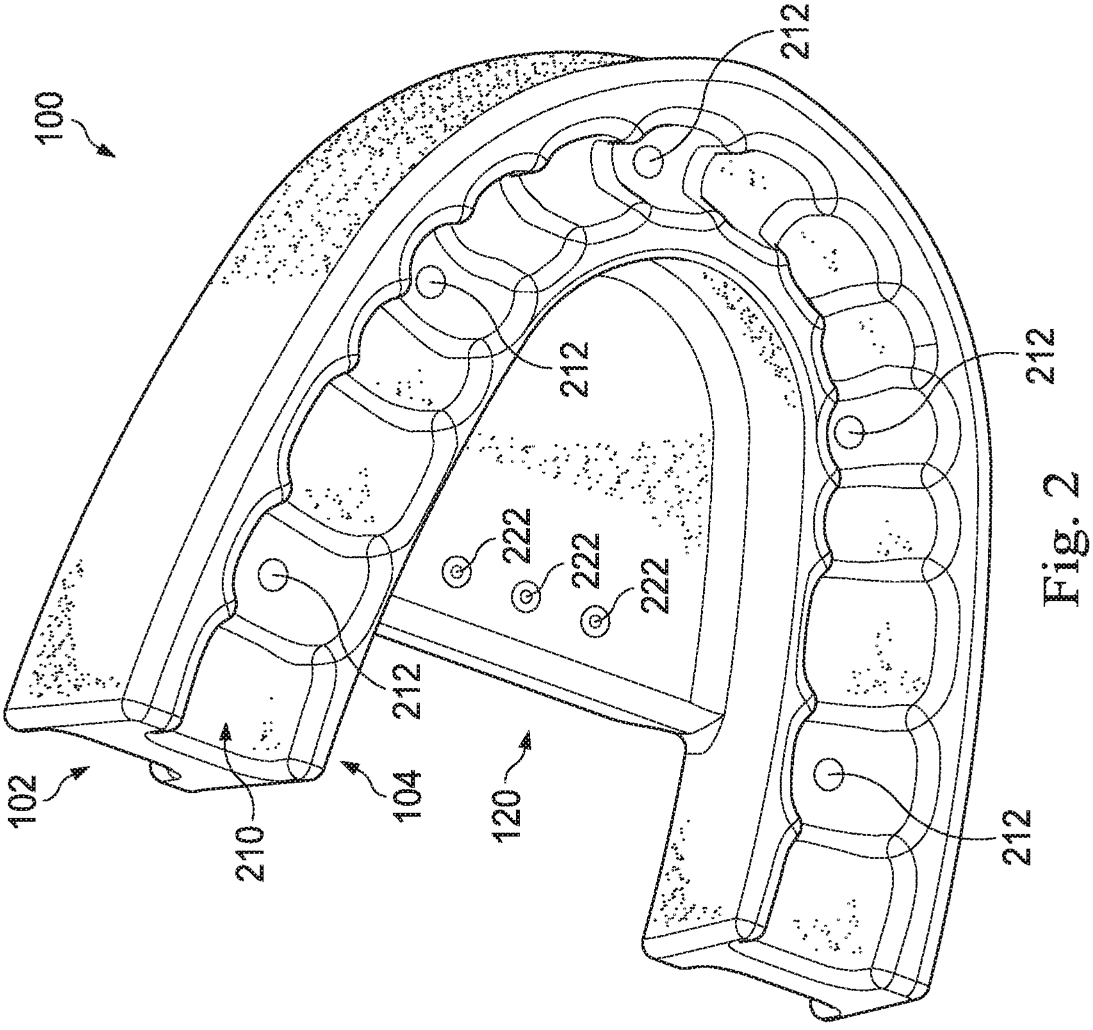
FIG. 2 is a bottom perspective view of a COPA device according to embodiments of the present disclosure.

FIG. 2 is a bottom perspective view of the COPA device 100 according to embodiments of the present disclosure. The bottom side 104 includes a recess 210 sized and shaped to conform to an intended user's dentition, for example, the lower teeth. The recess 210 is embedded with a plurality of sensors 212 similar to the sensors 112. The sensors 212 may be coupled to flexible or agile filament strands or a meshed structure. The prescription dispensing unit 120 includes a plurality of exit valves 222 on the bottom side 104, where prescribed substances may be released. While the COPA device 100 is illustrated with a top recess 110 imprinted with an intended user's upper teeth and a bottom recess 210 imprinted with an intended user's lower teeth, the COPA device 100 can include a single recess 110 or a single recess 210 to provide substantially similar functionalities.

Figure 3:
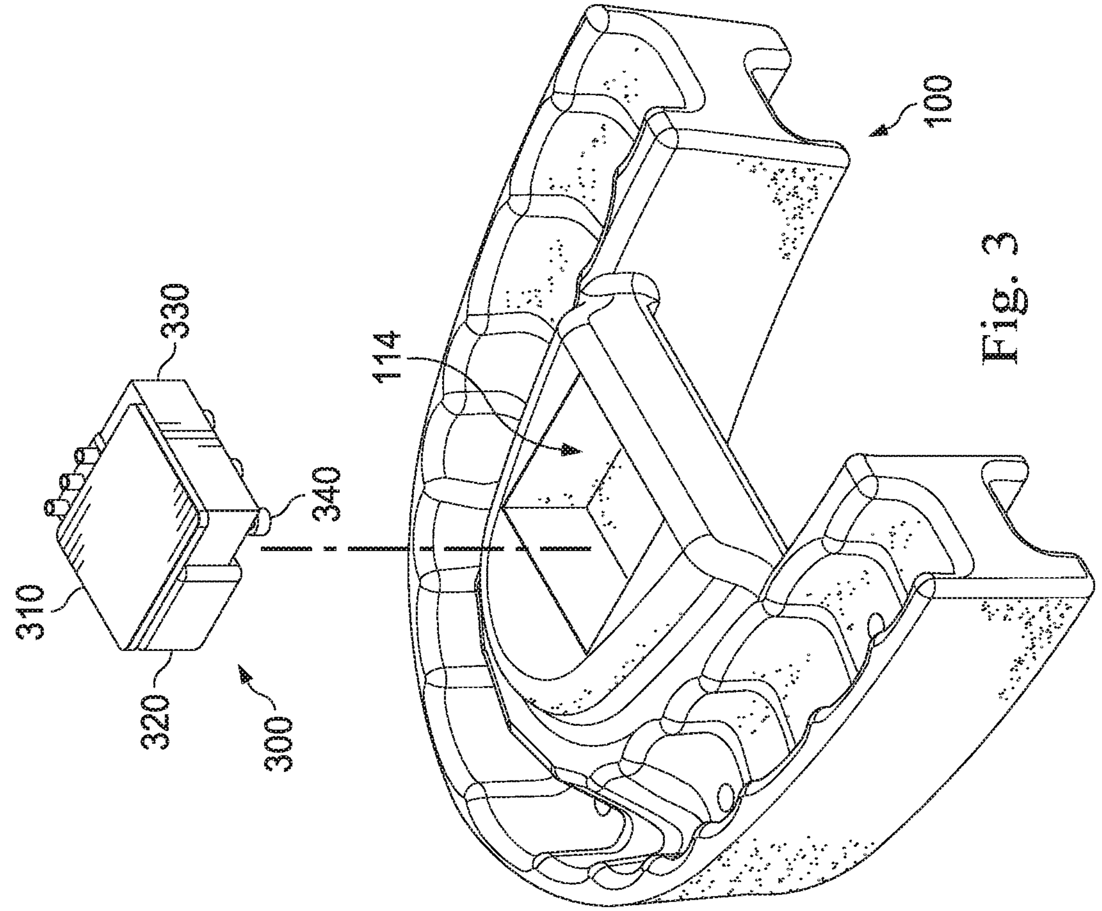
FIG. 3 is a perspective view of a COPA device and a pre-packaged micro-pump unit positioned for coupling according to embodiments of the present disclosure.
Figure 4:
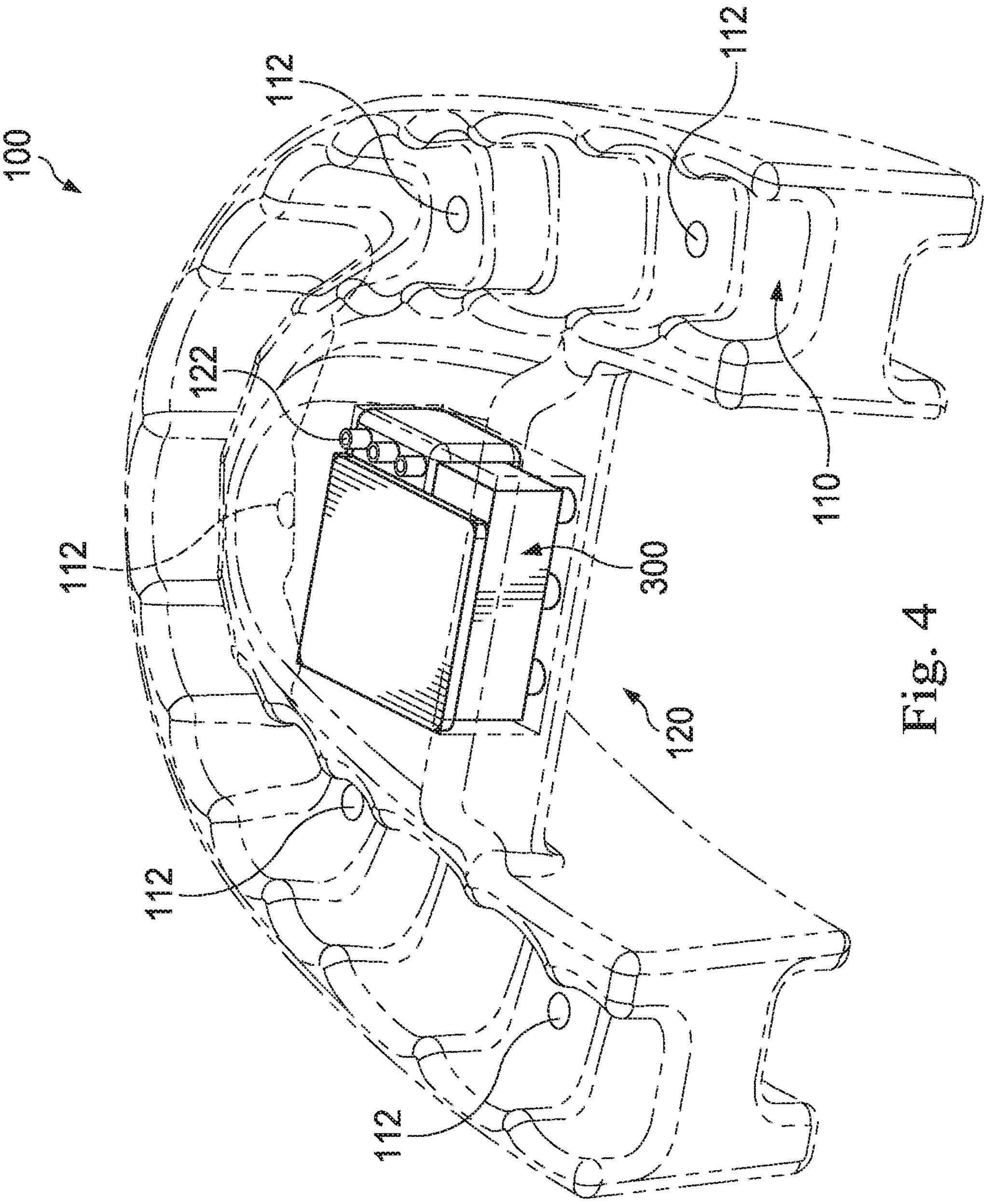
FIG. 4 is a perspective view of a COPA device coupled with a pre-packaged micro-pump unit according to embodiments of the present disclosure.
Figure 5:
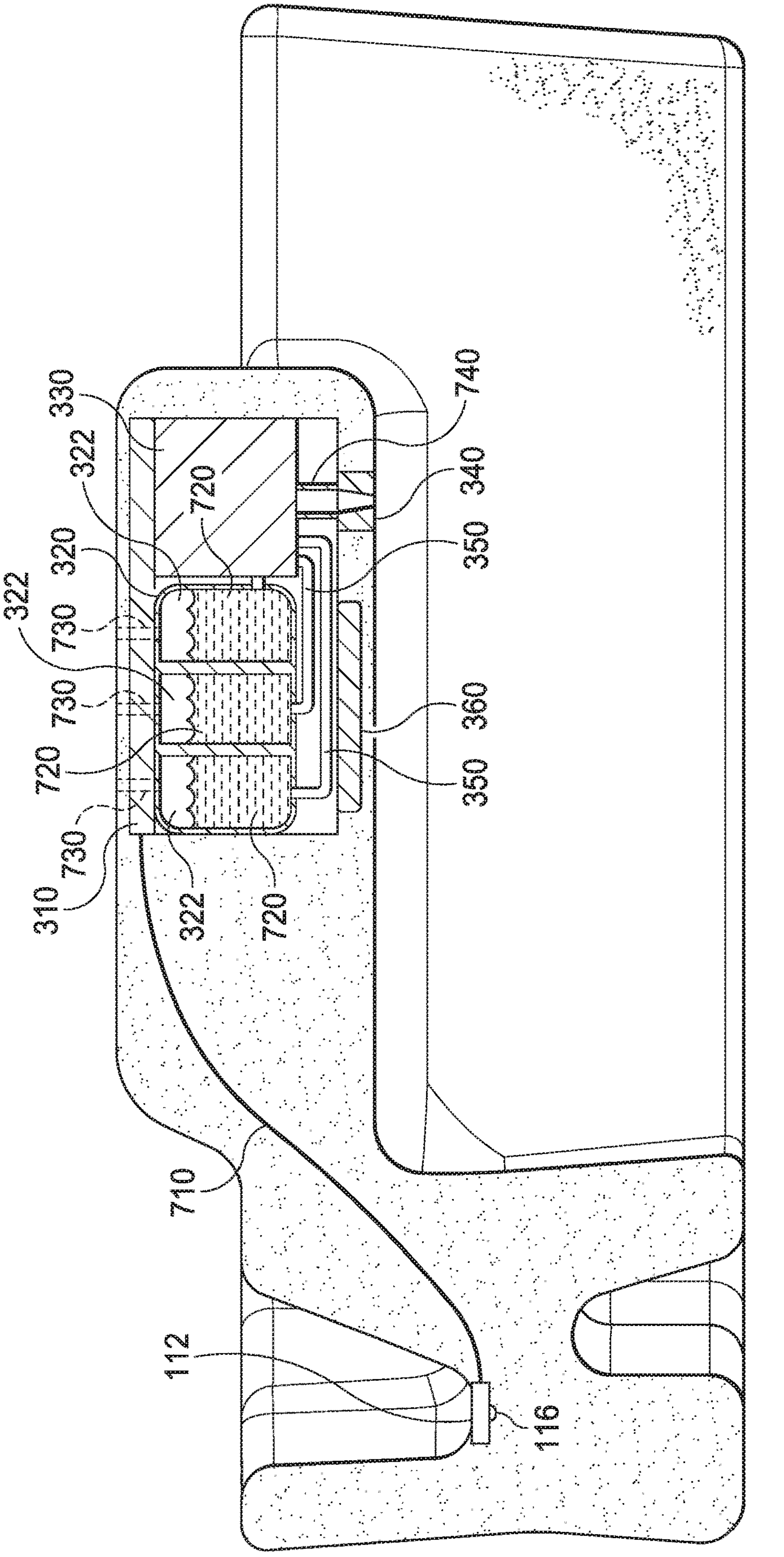
FIG. 5 is a cross-sectional view of a COPA device according to embodiments of the present disclosure.
Figure 6:
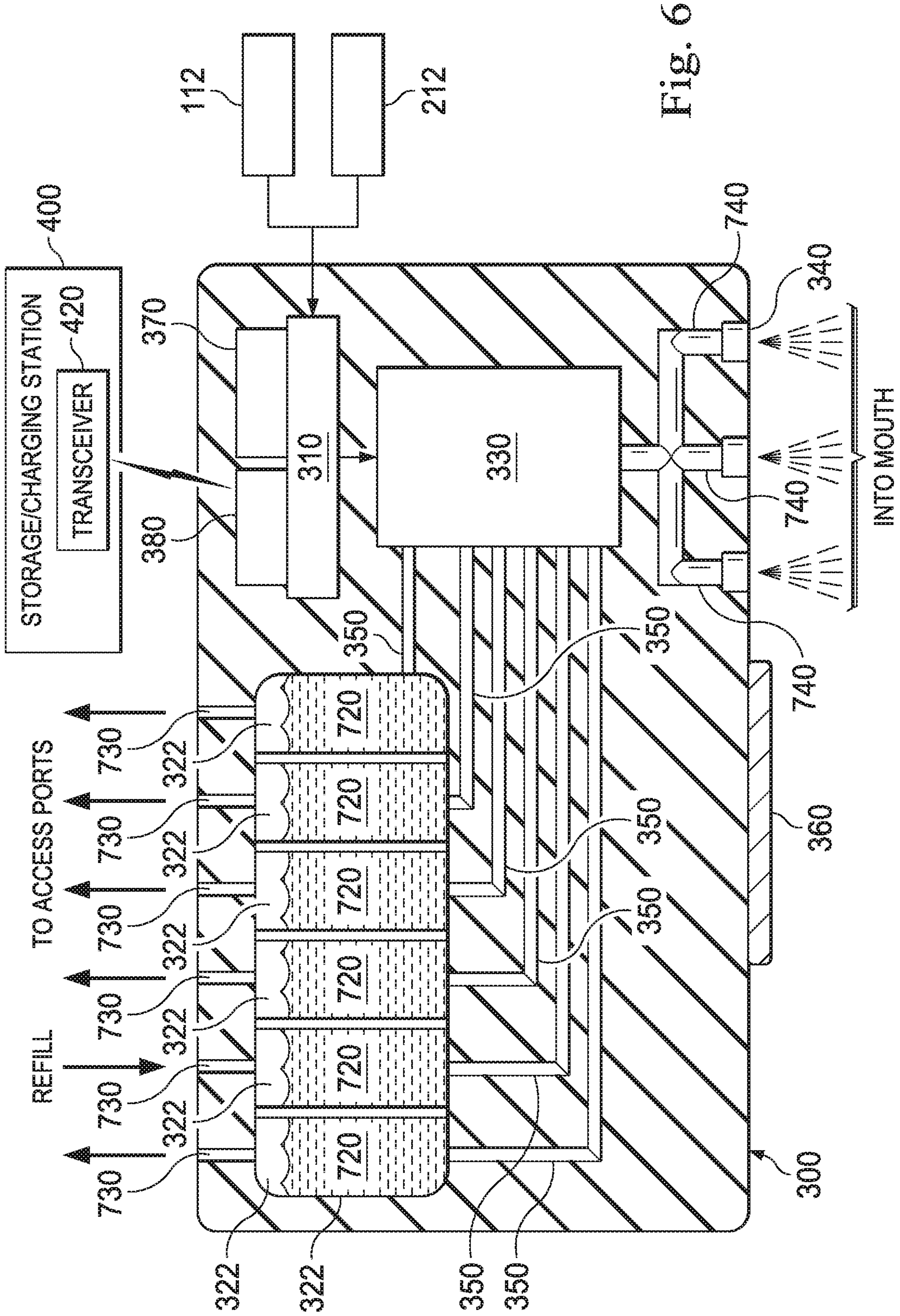
FIG. 6 is a schematic diagram of a micro-pump unit according to embodiments of the present disclosure.

Referring now to FIGS. 3-6, aspects of the COPA device 100 and micro-pump unit 300 are illustrated. FIG. 3 is a perspective view of the COPA device 100 and a micro-pump unit 300 positioned for coupling according to embodiments of the present disclosure, while FIG. 4 shows the micro-pump unit 300 coupled to the COPA device 100. The micro-pump unit 300 can be the core of the prescription dispensing unit 120. The micro-pump unit 300 includes a processor 310, a reservoir 320, an actuator 330, and a plurality of exit valves 340. The processor 310 is configured to control the micro-pump unit 300 and record activities associated with the COPA device 100, for example, dosage delivery time and amount, charged time, and/or wireless communication activities. The reservoir 320 is configured to hold a prescribed substance, for example, as formulated for delivery via the micro-pump unit 300. The actuator 330 is configured to push or deliver an exact dosage of the prescribed substance upon activation. The exit valves 340 are positioned at the bottom of the micro-pump unit 300 and are configured to release the prescribed substance for ingestion. More detailed views of the micro-pump unit 300 are shown in FIGS. 5 and 6 and the interactions among the components of the micro-pump unit 300 are described in greater detail below. The micro-pump unit 300 may be pre-packaged with a prescription through various mechanisms, as described in greater detail herein. As shown, the COPA device 100 may include a compartment 114 sized and shaped to receive the micro-pump unit 300. For example, the pre-packaged micro-pump unit 300 may be positioned within the compartment 114 and covered by the sealed sleeve 124 (shown in FIG. 1) to form the sealed prescription dispensing unit 120.

Figure 10:
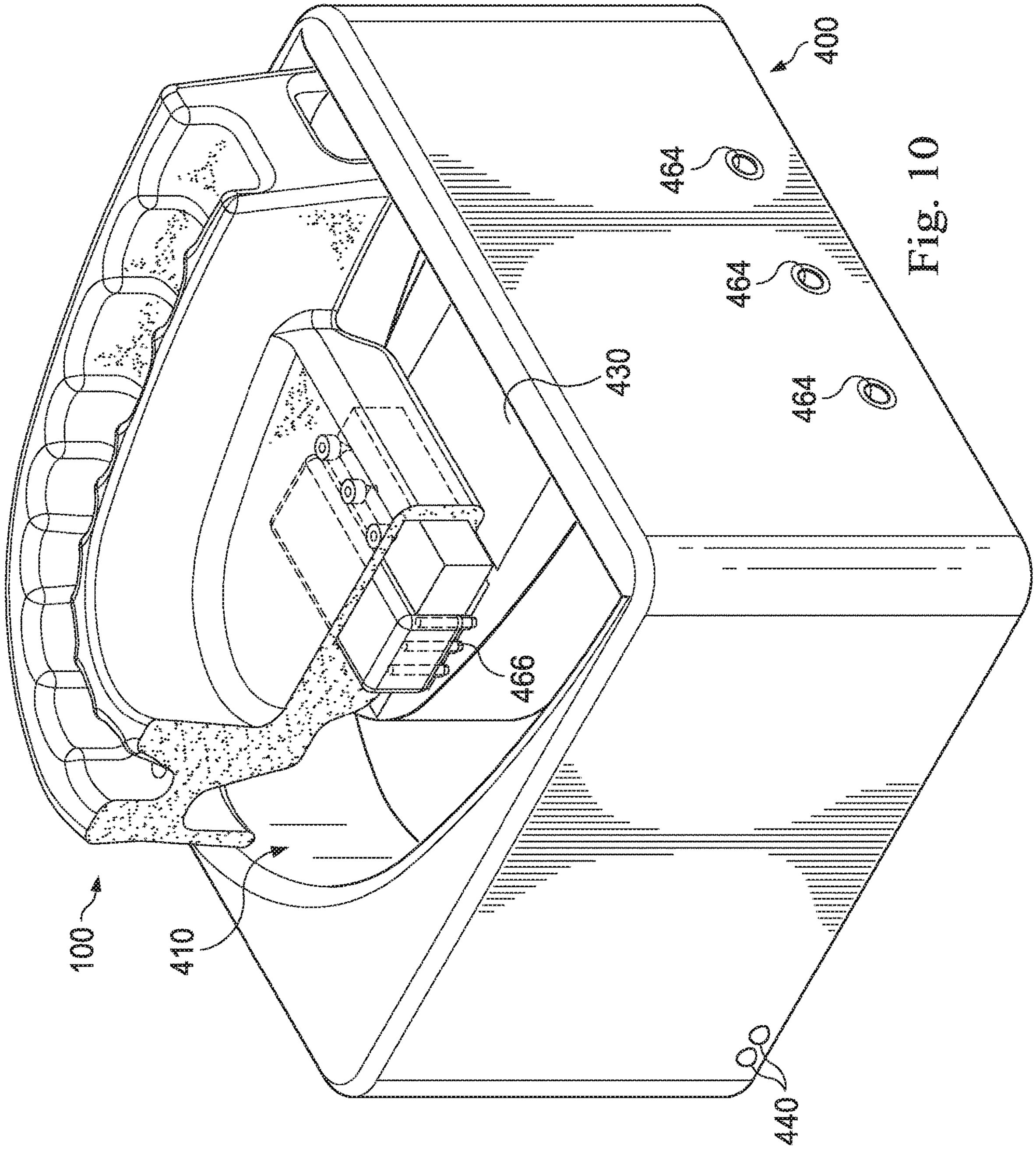
FIG. 10 is a perspective, partial cutaway view of a COPA device docked at a docking station according to embodiments of the present disclosure.

Referring now to FIG. 5, shown therein is a detailed view of the internal components of the micro-pump unit 300 and the interactions among the internal components according to embodiments of the present disclosure. In this regard, FIG. 5 is a cross-sectional view of the COPA device 100 according to embodiments of the present disclosure. The cross-sectional view is taken along the line 101 of FIG. 1. While FIG. 5 is illustrated with one of the sensors 112 positioned on a flexible or agile filament 116, the sensor 112 may be positioned on a meshed structure as described above. The micro-pump unit 300 is positioned within the compartment 114 (shown in FIG. 3) of the COPA device 100. The micro-pump unit 300 may further include a charging component 360 (e.g., batteries) and a memory 370 (shown in FIG. 10). The charging component 360 may be in communication with the processor 310 and the actuator 330. When the COPA device 100 is docked at the docking station 400, the charging component 360 may be coupled to the charging component 430 of the docking station 400 and configured to charge the COPA device 100 (e.g., the processor 310 and the actuator 330) via battery charging or wireless charging. The memory 370 may include volatile memory and non-volatile memory of any suitable memory types, including random access memory (RAM), read-only memory (ROM), programmable read-only memory (PROM), erasable programmable read-only memory (EPROM), electrically erasable programmable read-only memory (EEPROM), dynamic random-access memory (DRAM), static random-access memory (SRAM), and combinations thereof.

The processor 310 can be in communication with the sensor 112 and the actuator 330. The actuator 330 can be in communication with the reservoir 320 and the exit valves 340 via flow channels 350. The reservoir 320 can be in communication with the access ports 122 (shown in FIG. 1) and the flow channels 350.

The reservoir 320 may include one or more chambers 322, for example, one, two, three, four, five, six, or any suitable number of chambers 322. The chambers 322 may be configured to hold a prescribed substance 720. In this regard, the number and size of the chambers 322 can be selected based on the number of prescribed substances, type(s) of prescribed substances, and/or dosage amounts to be used. The chambers 322 can be any size that will still allow the device to be positioned within the mouth of a patient. In some instances, the chambers 322 are in communication with corresponding chambers or channels formed in the COPA device 100 to allow an increased volume of storage for the prescribed substance(s). The chambers 322 may be in communication with the access ports 122. In some embodiments, each chamber 322 is in communication with one of the access ports 122 through access cannulas 730.

A clinician or a pharmacy technician may fill or refill the prescribed substance 720 via the access ports 122. In addition, the docking station 400 may be used to fill or refill the prescribed substance 720 via the access ports 122 as described below. The prescribed substance 720 may include liquid formulations, powder formulations, multiparticulate formulations, or any other suitable formulations. In some embodiments, all chambers 322 are filled with liquid formulations. In some other embodiments, one chamber 322 may be filled with a liquid formulation and another chamber 322 may be filled with a powder or multiparticulate formulation. The prescribed substance 720 in the different chambers 322 may be released at the same time to form a particular formulation or at different times to prevent certain active ingredients in the prescribed substances 720 from reacting with each other. In this regard, each chamber 322 may contain a different prescribed substance 720 for the intended user.

The actuator 330 may be a micro-pump suitable for delivery of pharmaceutical formulations. The actuator 330 may be activated or triggered by the processor 310 to cause the prescribed substances 720 to flow through the flow channels 350 and exit cannulas 740 and release via the exit valves 340. The actuator 330 may be activated one or more times to release an exact dosage of the prescribed substances 720. The flow channels 350 may be constructed from suitable tubing materials. The exit valves 340 may be any suitable flow control valves, for example, with elastomeric membranes, configured to prevent leakage of the prescribed substances 720 into the user's mouth or backflow of the prescribed substance from the user's mouth into the COPA device 100.

The processor 310 may be any suitable microcontroller or microprocessor configured to perform the functions described herein, including functions such as performing patient identification and verification, performing position sensing and/or pressure detection (e.g., in conjunction with the sensors 112), instructing the actuator 330 to release a dose of the prescribed substance 720, controlling the opening of the exit valves 340, controlling operation of components of the micro-pump unit 300 in accordance with dosage instructions for an intended user, storing dispensing data, etc. The dosage instructions may include at least a dosage amount and timing for dispensing the substance to the intended user. The dosage instructions may be stored in the memory 370.

In operation, the COPA device 100 may be inserted into the mouth of a user. The user may close his or her mouth around the COPA device 100 and bite into the COPA device 100, which may trigger the sensors 112 to perform position and/or pressure measurements. The processor 310 may determine whether the COPA device 100 is correctly positioned within the user's mouth based on the measurements from the sensors 112. In some embodiments, position and/or pressure data of the user's mouth may be recorded and stored in the memory 370 when the COPA device 100 is created. The processor 310 may compare the current position and/or pressure measurements to the original position and/or pressure data to determine whether there is a match between the current user of the COPA device 100 and the intended user of the COPA device 100. The processor 310 may also compare the current position and/or pressure measurements to the original position and/or pressure data to determine whether the COPA device 100 is correctly positioned within the intended user's mouth.

When the user is verified as the intended user and the COPA device 100 is correctly positioned within the intended user's mouth, the processor 310 may send an activation instruction to the actuator 330 and open the exit valves 340 to administer one or more of the prescribed substances 720 stored in the micro-pump unit 300 in accordance with dosage instructions for the intended user. The activation of the actuator 330 and the opening of the exit valves 340 may be based on dosage instructions or prescriptions stored in the memory 370 when the prescribed substance 720 is filled. In this manner, a substance 720 can be dispensed from a reservoir of the micro-pump unit 300 coupled to the COPA device 100 in response to a sensing element determining that the intended user's unique dentition is positioned within the recess of the COPA device 100.

In some embodiments, the COPA device 100 may include one or more status indicators that can provide feedback and/or alerts to the user when the COPA device 100 is in use. The status indicator(s) may include a vibrating component, a sound generation component (e.g., speaker), and/or a visual indicator component. For example, the vibrating component can cause the COPA device 100 to vibrate with different pulsing patterns to indicate the different statuses of the COPA device (e.g., one vibration to indicate proper user authentication and initiation of dispensing, two vibrations to indicate completion of dispensing, patterned or repeated vibrations to indicate an error with the COPA device, etc.). Similarly, the sound generation component can generate various tones and/or patterns to indicate the different statuses of the COPA device. Likewise, the visual indicator component can include one or more LEDs that display different colors and/or patterns to indicate the different statuses of the COPA device. The current status of the COPA device 100 may be determined based on feedback from the processor 310, the sensors 112 or 212 (e.g., correct or incorrect positioning of the COPA device 100), sensors for monitoring the dispensing of the substance (e.g., volume and/or flow sensors), the docking station 400, and/or other sensors or monitoring devices associated with the COPA device 100 and/or the docking station 400 for determining the status of the COPA device 100.

FIG. 6 is a schematic diagram of the micro-pump unit 300 according to embodiments of the present disclosure. In this regard, FIG. 6 provides a more detailed view of the micro-pump unit 300 and interactions with the sensors 112, 212 and the docking station 400. As shown, the micro-pump unit 300 may further include a transceiver 380. The transceiver 380 can be a wireless transceiver and may implement any suitable wireless communication protocols. The transceiver 380 may wirelessly communicate with the docking station 400, for example, to upload recorded activities or to download revised or new dosage instructions, as described in greater detail herein. Further, the transceiver 380 may wirelessly communicate with other wireless communication devices, including a communication device (e.g., computer, tablet, smartphone, etc.) of the intended user. In this regard, the processor of the micro-pump unit 300 can be configured to initiate alerts or reminders to the user (e.g., based on a dosage timing of the dosage instructions) by triggering the intended user's communication device to issue such an alert or reminder (e.g., by activating an audible and/or visual indicator). Similarly, the processor of the micro-pump unit 300 and/or the docking station 400 can be configured to initiate alerts or reminders through communications with a communication device of a medical provider. For example, the micro-pump unit 300 and/or the docking station 400 may alert the medical provider based on a failure to dispense the substance in accordance with the dosage instructions (e.g., the patient is not taking the medication as prescribed) and/or multiple failed attempts to authenticate the intended user (e.g., indicating that someone other than the intended user is attempting to access the medication or that the intended user is having difficulties using the device). In some instances, the transceiver 380 may also be a wired or optical transceiver and may implement suitable communication protocols. For example, the transceiver 380 may communicate with the docking station 400 when docked or otherwise coupled with the docking station 400.

Figure 7:
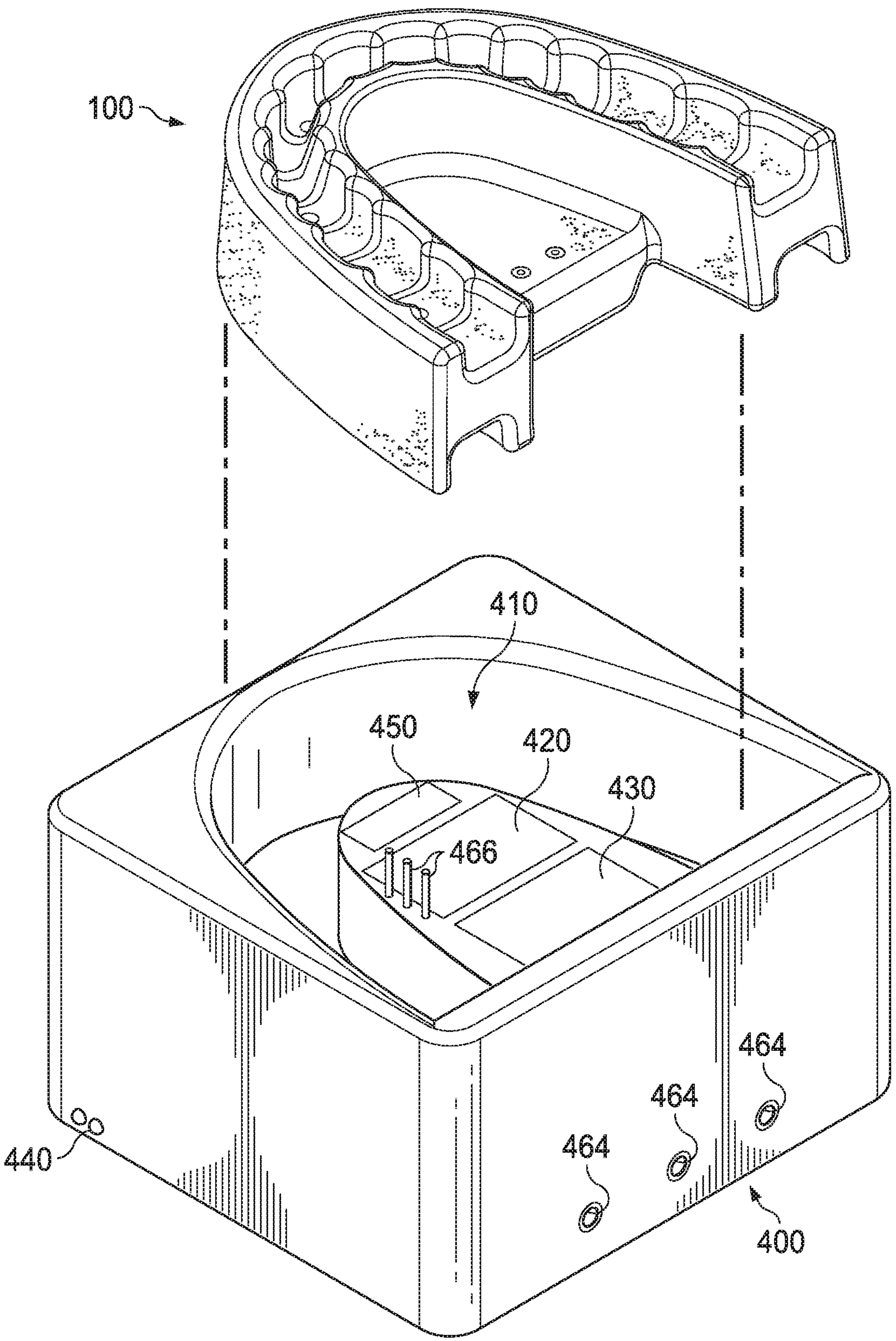
FIG. 7 is a perspective view of a COPA device and a docking station according to embodiments of the present disclosure.

FIG. 7 is a perspective view of the COPA device 100 positioned for docking at a docking station 400 according to embodiments of the present disclosure. The COPA device 100 may be positioned into the docking station 400 for storage, charging, filling, refilling, emptying, and/or communicating over a communications network. The docking station 400 may include a docking compartment 410, a transceiver 420, a charging component 430, a plurality of status indicators 440, a COPA device sensing component 450, a dispensing unit 460, an identification unit 470, and/or a processing system 480. While these components are illustrated as being separate components, it is understood that at least some of the functionalities of these components may be combined within a single component or system. Accordingly, in some instances one or more of these components may be omitted and some or all of the associated functionality may be incorporated into one of the other components. Generally, the transceiver 420, the charging component 430, the status indicators 440, the sensing component 450, the dispensing unit 460, the identification unit 470, the processing system 480 and/or any components thereof may be arranged as shown or in any suitable configuration as part of the docking station 400 and/or attachment(s) thereto.

The docking compartment 410 may include a housing sized and shaped to receive at least a portion of the COPA device 100. In some instances, the docking compartment 410 includes a recess sized and shaped to receive the COPA device. In this regard, the identification unit 470 can be utilized to determine the identity of the intended user based on the received COPA device 100. In some instances, the identification unit 470 is configured to determine the identity of the intended user of the COPA device 100 based on a communication with the COPA device. For example, the identification unit 470 may obtain identification information for the COPA device 100 via an RFID tag, bar code, serial number, processing chip identification, information stored in memory of the COPA device, a communication from the COPA device, and/or any other suitable identification technique. In some implementations, the identification unit 470 matches a processor or other identifiable component of the COPA device 100 (e.g., processor 310 of the micro-pump unit 300) to an intended user based on a user identification table, a correlation to a processor or other identifiable component of the docking station 400, and/or combinations thereof.

In some instances, the identification unit 470 is configured to determine the identity of the intended user of the COPA device 100 based on a correlation between one or more structural features of the mouthpiece and one or more structural features of the intended user's dentition. For example, in some implementations at least a portion of the recess can be shaped to mimic the dentition of the intended user such that docking station 400 can determine whether the COPA device 100 is that of the intended user or another COPA. For example, pressure sensors and/or position sensors similar to those used by the COPA device 100 can be utilized by the identification unit 470 to determine whether the received COPA device matches the intended user's dentition structure of the docking station 400. In some instances, the COPA device 100 itself can be used to authenticate by determining that the simulated dentition of the docking compartment matches that of the intended user based on the fit of the simulated dentition with the recess(es) of the COPA device 100. If the COPA device 100 does not match the intended user, then the docking station will alert the user to the error (e.g., via status indicator(s) 440). The subsequent operation of the docking station 400 may be dependent on the identification unit 470 verifying that the received COPA device 100 is that of the intended user.

The transceiver 420 may be configured to transmit and receive data. In this regard, the transceiver may be configured to communicate with the COPA device 100. Further, the transceiver 420 may be configured to communicate with a remote computing device over a communications network using wired/cable and/or wireless protocols. The COPA device 100 may upload prescription administration activities via the transceiver 420 to a COPA management system, as described in U.S. patent application Ser. No. 15/406,043, filed Jan. 13, 2017, which is hereby incorporated by reference in its entirety.

The charging component 430 may include a haptic charging component (e.g., for charging batteries) and may be configured to charge the COPA device 100 while the COPA device 100 is docked at the docking station 400. For example, the operations of the processor, the actuators, and the releasing of the prescribed substances by the COPA device may operate based on electrical power.

The COPA device sensing component 450 may be configured to detect whether the COPA device 100 is docked correctly. For example, the bottom side 104 of the COPA device 100 may further include a docking station sensing component, where alignment between the COPA device 100 and the docking station 400 may be detected via the COPA device sensing component 450 and the docking station sensing component. After detecting alignment, the charging component 430 may begin to charge the COPA device 100. In some instances, the COPA device sensing component 450 and the identification unit 470 are combined into a single component.

The status indicators 440 may include light-emitting diodes (LEDs). The status indicators 440 may be configured to indicate whether the COPA device 100 is positioned correctly within the docking compartment 410 for storage, charging, filling, refilling, emptying, and/or communicating over a communications network. The status indicators 440 may be further configured to indicate the charging status (e.g., power on/off) of the COPA device 100 and/or the transmission and/or reception activities of the transceiver 420.

In some embodiments, the docking station 400 provides a closed loop control system that can sense and detect the presence of the COPA device 100 at various stages of use and/or storage and provide corresponding feedback and/or alerts to the user, caregiver, doctor, and/or pharmacy. For example, the status indicators 440 may be configured to indicate that the COPA device 100 is within proximity of the docking station 400, properly docked within the docking station 400, improperly docked within the docking station 400, charging, fully charged, transferring data, operating properly, operating improperly, and/or other status indications. In some embodiments, the docking station 400 may include a sound generation component (e.g., a speaker) that can generate various tones and/or vibrations to indicate a current status, including the proximity or docking of the COPA device 100, charging activities, and/or communication activities. In some embodiments, the docking station 400 can be in communication with a computing device such as a smartphone, tablet, or computer (e.g., via a transceiver 420 or via a wired connection) and may send the feedback and/or alerts (as well as logs of prescription administration activities obtained from the COPA device 100) to a COPA smartphone or tablet application.

The COPA device 100 may be placed in the docking station 400 between dosages for storage, charging, filling, refilling, emptying, and/or communicating over a communications network as needed (e.g., multiple times per day, daily, nightly, weekly, etc.). The charging and/or power needs of the COPA device 100, including the prescription dispensing unit 120, may be minimal since the operations associated with dispensing the medications may typically span short durations (e.g., 1 minute or less). In addition to charging and communications, the docking station 400 may help prevent the COPA device 100 from being lost, misplaced, or damaged. For example, the docking station 400 may further include locking mechanisms to provide additional protocols for matching the COPA device 100 to an intended user. In an embodiment, the docking station 400 may include a thumbprint, optical (e.g., retina, cornea, etc.), and/or DNA (e.g., saliva) scanning component or any other suitable biological identification recognition mechanism configured to unlock or release the COPA device 100 based on verification against the intended user's associated biological markings.

Figure 8:
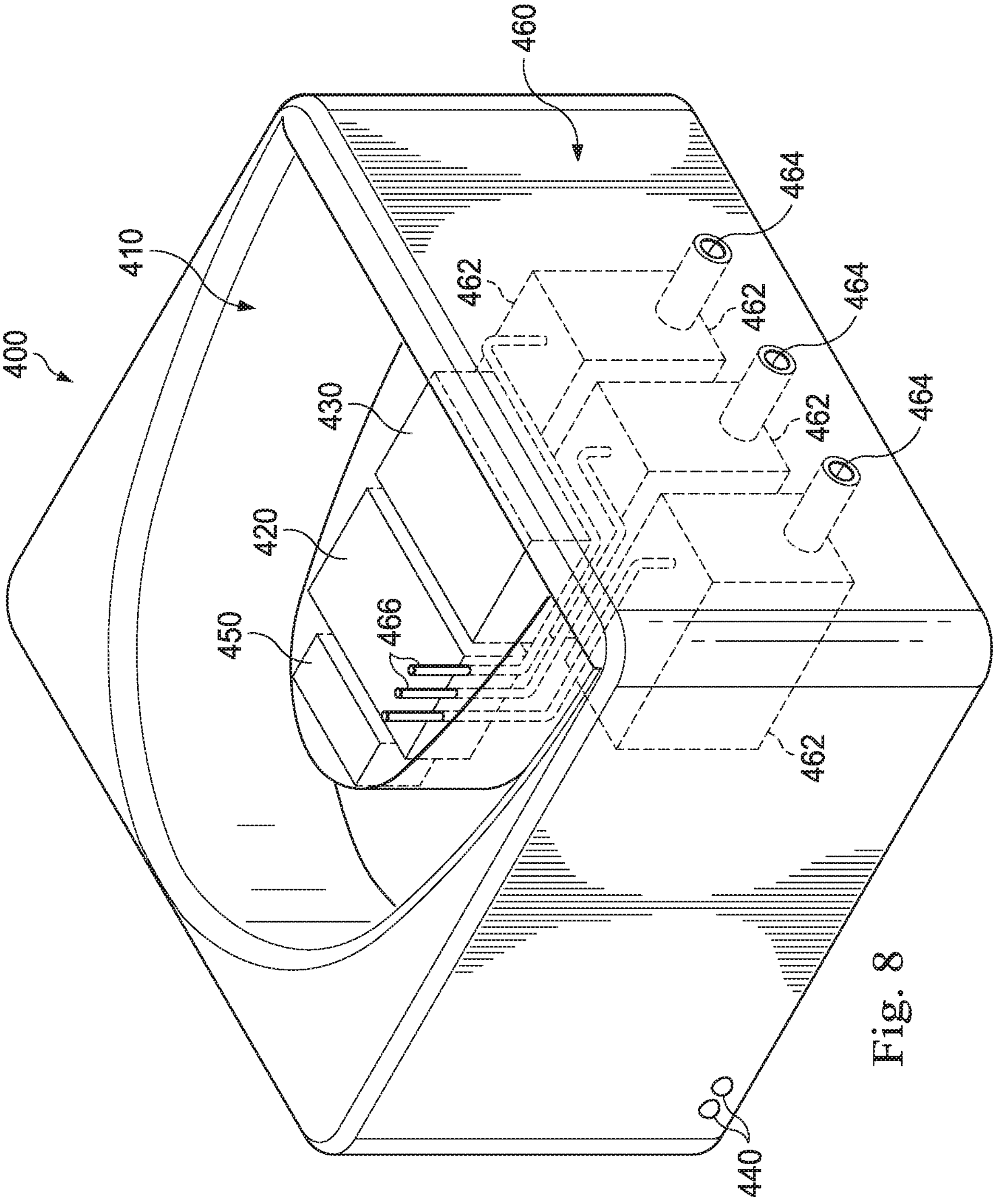
FIG. 8 is a perspective view of a docking station according to embodiments of the present disclosure.
Figure 9:
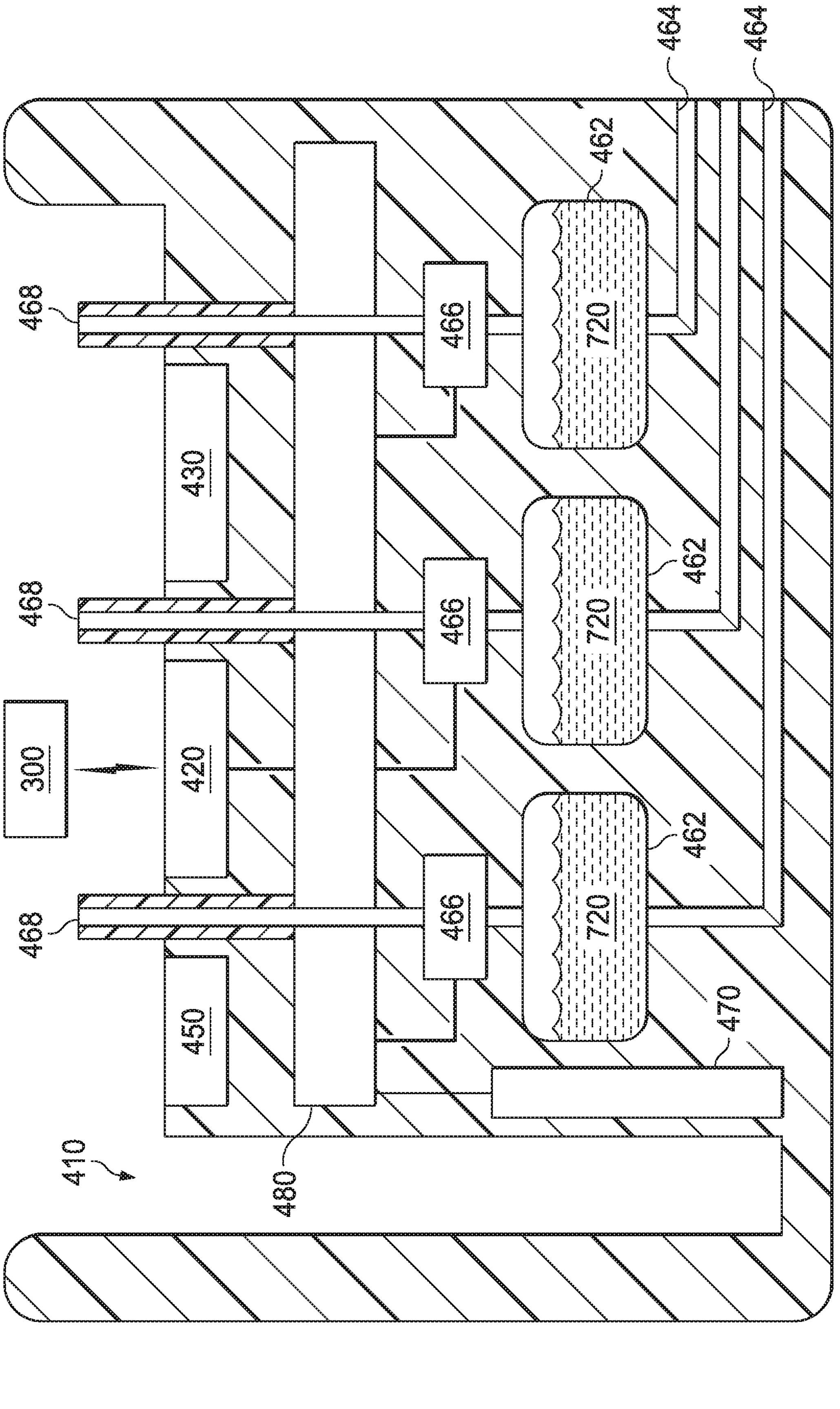
FIG. 9 is a cross-sectional view of a docking station according to embodiments of the present disclosure.

As shown in FIGS. 8 and 9, the dispensing unit 460 and its associated components can be used to control the filling, refilling, and/or emptying of the COPA device 100. In this regard, the dispensing unit 460 includes holding reservoir(s) 462, inlet(s) 464, actuator(s) 466, and outlet(s) 468. The holding reservoir(s) 462 are utilized to hold the prescribed substance(s) 720, which may be introduced into the holding reservoir(s) 462 via the inlet(s) 464. The dispensing unit 460 may include multiple holding reservoirs configured to hold the same or different prescribed substances. In this regard, the holding reservoir(s) 462 generally have a volume equal to or greater than the reservoir(s) 320 of the COPA device 100. For example, the holding reservoir(s) 462 of the dispensing unit 460 can have a volume two, three, four, or more times greater than the reservoir(s) 320 of the mouthpiece. In this regard, the holding reservoir(s) 462 of the dispensing unit 460 of the docking station 400 may be sized to contain multiple doses (e.g., day(s), week(s), month(s), etc.) of the substance based on the intended user's dosage information, while the reservoir of the COPA device 100 may be sized to contain one or more doses based on the intended user's dosage information. In some instances, the volume of the holding reservoir(s) 462 is greater than 5 ml, 10 ml, 50 ml, 100 ml, 250 ml, 500 ml, 1,000 ml or more. In some instances, the volume of the reservoir(s) 320 of the COPA device 100 is less than 1,000 ml, 500 ml, 250 ml, 100 ml, 50 ml, 10 ml, 5 ml, or less. The volumes of the holding reservoir(s) 462 and/or the reservoir(s) 320 may be sized based on expected dosage sizes, expected substance form (e.g., liquid, pellets, granules, micro particles, mini tablets, powders, pills, etc.), and/or combinations thereof.

The actuator(s) 466 (e.g., pumps) can be utilized to dispense the prescribed substance 720 from the holding reservoir(s) 462 to the COPA device 100 via the outlet(s) 468. In this regard, the dispensing unit 460, including the actuator(s) 466, may be similar to the micro-pump unit 300 described above. The dispensing unit 460 may have a separate actuator 466 for each holding reservoir 462 or a single actuator 466 may dispense the prescribed substance from multiple holding reservoirs 462. Accordingly, the amount of the prescribed substance 720 dispensed from the holding reservoir(s) 462 to the COPA device 100 via the outlet(s) 468 can be precisely controlled. In some instances, the outlet(s) 468 are configured to engage with the access ports 122 of the COPA device 100 (e.g., via a male/female engagement, snap fit, or other suitable coupling to facilitate transfer of the prescribed substance 720) when the COPA device is docked in the docking station 400.

The dispensing unit 460 can be configured to dispense the prescribed substance 720 based on dosage instructions for the substance for the intended user. The dosage instructions can be stored in memory associated with the dispensing unit 460 and/or the docking station. The dosage instructions can include dosage amount(s), dosage timing(s), and/or other parameters. The dispensing unit 460 can also be configured to store in memory dispensing data associated with the prescribed substance 720 being dispensed into the reservoir 320 of the COPA device 100. The dispensing data can include at least a dispensed amount, a dispensed time, a dispensed location, and/or other parameters. The dispensing unit can also be configured to dispense the prescribed substance 720 into the reservoir 320 of the COPA device 100 based on an amount of the substance in the reservoir of the mouthpiece. In this regard, the dispensing unit can configured to receive a communication indicating the amount of the substance in the reservoir of the COPA device from the COPA device itself or from a central unit in communication with the dispensing unit 460 and/or docking station 400.

Figure 11:
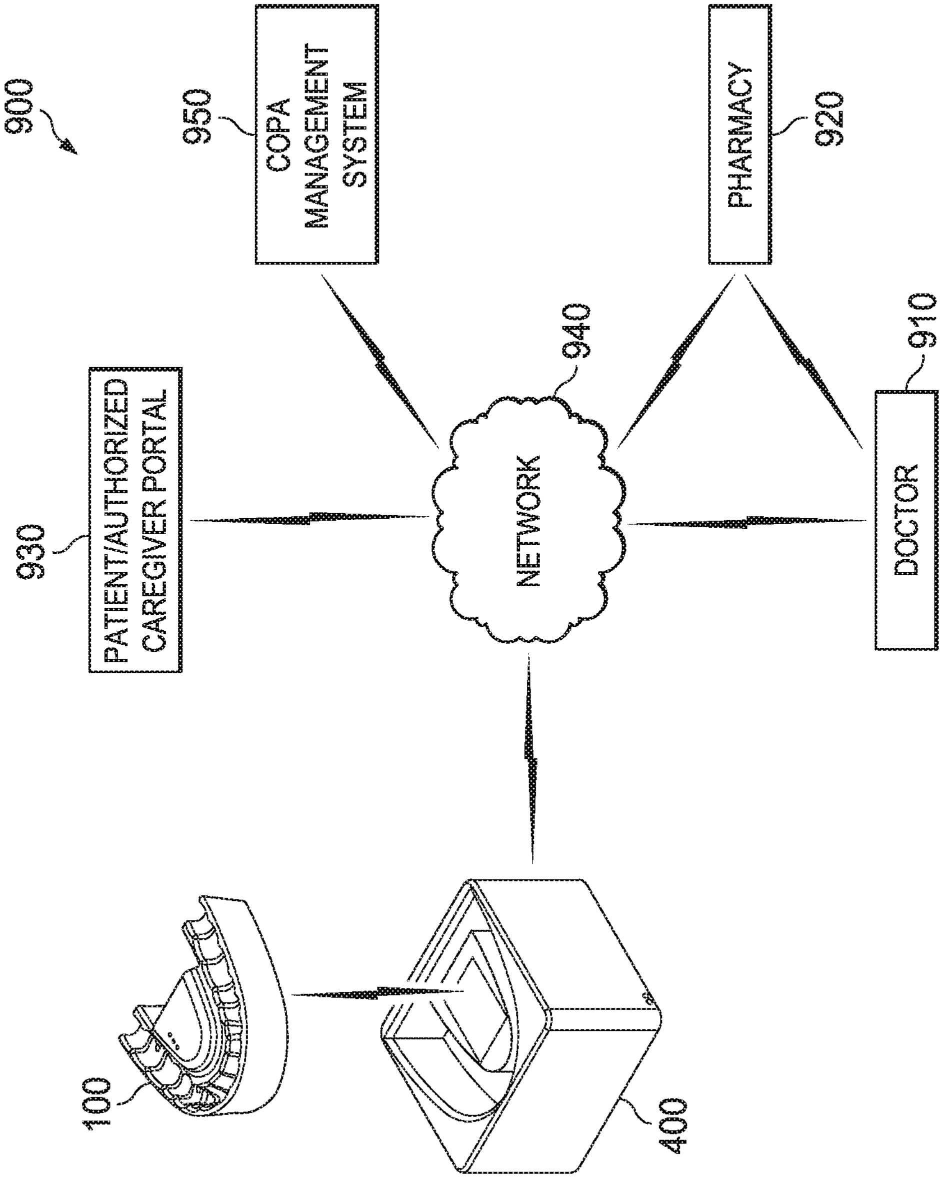
FIG. 11 is a schematic diagram of a COPA system according to embodiments of the present disclosure.

FIG. 11 is a schematic diagram of a system 900 according to embodiments of the present disclosure. The system 900 includes the COPA device 100, the docking station 400, a doctor 910, a pharmacy 920, a patient/authorized caregiver portal 930, and a central management system 950 in communication with each other via a network 940. The network 940 may include one or more wireless access networks and/or one or more wireline networks that may connect to a backbone network or the Internet. The network 940 may include network encryption and security policies for protecting patients' privacy. The network 940 may include cloud storage for data storage and retrieval across the network 940 based on the encryption and security policies. The doctor 910 may be a registered doctor for the prescription management system. The pharmacy 920 may be an approved pharmacy and/or a COPA device (e.g., the mouthpiece) fabricator. A COPA fabricator may be individuals or organizations trained in procuring standardized dental impressions (e.g., the COPA device 100) that capture varying individual elements of the intended recipients' dentition. The system 900 may provide an identification system for tracking the path of prescription administration and management to prevent misuse and mismanagement.

At a high level, the doctor 910 may prescribe a medication to a patient and the pharmacy 920 may create the mouthpiece for the patient and fill the mouthpiece and/or docking station 400 according to the prescription(s) provided by the doctor 910. The pharmacy 920 may program the micro-pump unit of the mouthpiece and/or the docking station 400 to deliver an exact dosage of the prescribed medication and/or a dosage intake time. In this regard, dosage instructions for the patient may be stored in memory of the micro-pump unit and/or the docking station 400. The patient may insert the mouthpiece into the patient's mouth and the micro-pump unit will, upon verification that the user is the intended recipient, dispense the prescribed medication as programmed. The patient may dock the mouthpiece at the docking station 400 when the mouthpiece is not in use. The docking station 400 may charge the mouthpiece, communicate with the doctor 910 and/or the pharmacy 920 via wireless and/or wired connections, and/or fill, refill, and/or empty the mouthpiece in accordance with the most current treatment plan. The doctor 910 and/or the pharmacy 920 may monitor and retrieve information associated with the dispensing of the prescribed medication from the docking station 400. The doctor 910 may provide instructions to adjust the dosage instructions based on the monitoring and/or the retrieval information, and/or based on evaluations of the patient's progress. The pharmacy 920 may send instructions to the docking station 400 to adjust the dosage instructions stored in the memory of the micro-pump unit and/or the docking station 400 based on the order from the doctor 910. For example, when the mouthpiece is docked at the docking station 400, the dosage instructions stored in the memory can be updated or re-programmed accordingly. Alternatively, the dosage instructions stored in the memory of the micro-pump unit and/or the docking station 400 can be updated or re-programmed at the pharmacy 920. Similarly, the doctor 910 may prescribe new medication based on the monitoring and/or the retrieval information, and/or based on evaluations of the patient's progress. The pharmacy 920 may refill the micro-pump unit 300 and/or the docking station 400 accordingly.

The patient/authorized caregiver portal 930 may be stored on a computer server or in cloud storage on the network 940. The management system 950 may be hosted on the network 940. The management system 950 may include a master database that stores information associated with the patient and all COPA activities. For example, the management system 950 may allow doctors (e.g., the doctor 910), assembly or fulfillment technicians, pharmacists (e.g., the pharmacy 920), and any healthcare personnel that partake in the COPA process to access at least some portions of the master database, for example, based on logins. In an embodiment, different personnel may have different login profiles and the accesses to the master database may be based on login profiles. In some embodiments, the patient/authorized caregiver portal 930 may be hosted on the management system 950 and may have certain accesses to the master database. The patient information may include an identification of the patient, health history, prescription history, identification of the processor 310 within the COPA device 100, identification of the docking station 400 at which the COPA device 100 is charged, etc. The patient's identification may include a social security number (SSN) of the patient or other unique identifier. The prescription history may include identifications of doctors (e.g., the doctor 910) who prescribed medications to the patient, identifications of pharmacies (e.g., the pharmacy 920) at which the prescribed medications were filled or refilled, identifications of the prescribed medications, and an identification of the processor 310 within the micro-pump unit 300 where the medications were filled. The prescription history may also be stored and managed by the management system 950. The physicians' identifications may include national provider identifiers (NPIs) of the physicians. The NPIS are unique identification number for Health Insurance Portability and Accountability Act (HIPPA) covered physicians. The pharmacies' identifications may include an impression technician identifier (ID), an assembly technician ID, and a registered pharmacy ID. The impression technician ID identifies the technician who created the COPA device 100 for the patient. The assembly technician ID identifies the technician who assembled or filled the prescribed medication into the micro-pump unit 300 of the COPA device 100. The pharmacy ID identifies the pharmacy at which the prescribed medication was filled. The prescribed medications' identifications may include dosage IDs that identify each prescribed substance or formulation filled into the micro-pump unit 300 of the COPA device 100.

In an embodiment, the doctor 910 may examine a patient and determine whether alternative therapies may be helpful to the patient. When the doctor 910 determines that the patient is in need of a particular medication, for example, according to guidelines for drug formulations based on COPA dosing options, the doctor may order a prescription for the patient. The doctor 910 may electronically transmit the prescription to the pharmacy 920 via the network 940, for example, according to HIPPA standards of protection for data and electronic medical record (EMR) formats.

At a COPA fabricator, an impression technician may take an impression of the intended patient's mouth and teeth to create a mold for the COPA device 100, for example, according to COPA guidelines and instructions. The mold may include a sealed sleeve similar to the sealed sleeve 124. For example, the impression technician may use a dental tray filled with bio friendly polymers to create an imprint of the patient's dentition. COPA approved dentists, hygienists, and/or other trained professions (e.g., a COPA device assembly technician) may complete the creation of the mold for the COPA device 100.

An assembly technician may prepare a pre-packaged micro-pump unit 300. Each micro-pump unit 300 may be identified based on an ID of the processor 310 embedded within the micro-pump unit. The assembly technician may record the ID of the micro-pump unit 300 in the management system 950. For example, the assembly technician may enter the ID into the management system 950, query a COPA device ID database of the management system 950 that stores and tracks IDs of COPA devices (e.g., the COPA device 100), and create a new record for the COPA device 100 created for the patient. The assembly technician may activate the processor 310 within the micro-pump unit 300, for example, wirelessly. The activation may include programming the processor 310 according to the order received from the doctor 910. The programming may include the dosage instructions for the patient (e.g., a dosage amount and the dosage timing for each prescribed medication). As described above, different chambers 322 may be filled with different formulations. Thus, the programming may include a release sequence, specific release times, and/or release durations for the different formulations, and/or intervals between releases. For example, some formulations may be programmed for instant release (IR) and some formulations may be programmed for extended release (ER).

After activating the micro-pump unit 300 or the processor 310, the assembly technician may place the activated micro-pump unit 300 into the top center of the mold where the sealed sleeve is positioned. The micro-pump unit 300 may be positioned such that the access cannulas 730 extend outside the sealed sleeve through the access ports 122 and the exit cannulas 740 extend through the base of the mold. The assembly technician may place a filament or a mesh of sensors 112 into the recess 110 of the COPA device 100. The assembly technician may attach a hose from an air compressor to the access ports 122 on top of the mold such that pressurized air may be pumped through the access cannulas 730 into the micro-pump unit 300 to ensure that the flow channels 350 are not compressed during the filling of the mold. The assembly technician may pump a liquid polymer into the mold and allow the liquid polymer to set. After the liquid polymer is set, the COPA device 100 is complete.

Upon completion of the COPA device 100, the COPA device 100 can be transferred to the pharmacy 920. At the pharmacy 920, a pharmacy staff (e.g., a COPA fulfillment technician) may place the COPA device 100 on a pedestal or other structure configured to allow access to the micro-pump unit 300 for filling. Similarly, the pharmacy staff may access the docking station 400 for filling. The pedestal may be covered by a sterile sleeve each time prior to placing a COPA device on the pedestal. The pharmacy staff may retrieve a record of the COPA device 100 and/or docking station 400 based on the ID of the processor within the COPA device 100 and/or docking station 400, for example, from the COPA management system 950 via the network 940. The pharmacy staff may procure the medications (e.g., vials, pouches, bottles, etc.) from a drug manufacturer based on the dosage specified in the order received from the doctor 910. The pharmacy staff may update the record for the COPA device 100 and/or docking station 400. The pharmacy staff may activate or open control valves at the access ports of the COPA device and/or docking station 400 to inject or deposit the formulated prescription (e.g., the prescribed substance 720) into one or more reservoir(s) of the micro-pump unit 300 of the COPA device 100 and/or one or more reservoir(s) of the docking station 400. After completing the filling, the pharmacy staff may close the control valves of the micro-pump unit 300 and/or the docking station 400. The pharmacy staff may repeat the same process for filling other chambers and/or reservoirs of the micro-pump unit 300 and/or the docking station 400. Subsequently, the releasing of the formulated prescription by the COPA device 100 can be based on matching of the intended recipient's dentition and the COPA device 100 as described above. Similarly, the filling, refilling, and/or emptying of the COPA device 100 by the dispensing unit 460 of the docking station 400 can be based on matching of the COPA device 100 to the intended user (e.g., using identification unit 470) as described above. It should be noted that in some embodiments, the pharmacy 920 and the COPA fabricator may be the same entity.

The initial ID (e.g., of the processor 310) created for the COPA device 100 and/or the docking station 400 can be a permanent ID for the COPA device 100 and/or the docking station 400. Information associated with the filled prescription may be associated with the ID of the COPA device 100 and/or the docking station 400 and recorded in the management system 950 and/or an internal tracking system of the pharmacy 920. Thus, the COPA device 100 and/or the docking station 400 are fully traceable through the creation and preparation path. In addition, the mold used to craft the COPA device 100 may be assigned with a mold ID and may be stored in the management system 950 in association with the ID of the processor 310. Protocols for the use of the stored molds may be documented and records of subsequent mouthpieces may be stored in association in the management system 950. As such, misuse or fraud may be traced via the management system 950. An initial ID created for the docking station 400 can be used in a similar manner to track usage in an effort to minimize misuse and/or fraud.

The pharmacy staff may pair the COPA device 100 with the docking station 400. The pharmacy staff may record an ID of the docking station 400 in association with the COPA device 100 in the management system 950. The transceiver 420 of the docking station 400 may be recorded and registered in the management system 950 for remote access to the processor 310 embedded in the COPA device 100. For example, a pharmacy staff may adjust the dosage of the filled prescribed medication based on the instructions or an order of the prescribing doctor 910 by accessing the processor 310 via the transceiver 420 without the patient returning the mouthpiece to the pharmacy 920 prior to depletion of the active ingredient(s). The adjustment may allow for a limited number of revisions, for example, to the dosing amount per release, the timing of the release, suspension of one or more of the chambers 322.

The patient may pick up the COPA device 100 and/or the docking station 400 from the pharmacy 920 and the pharmacy staff may provide instructions of usage to the patient. The patient may insert the COPA device 100 into the patient's mouth and close the mouth to bite on the COPA device 100 so that the prescription dispensing unit 120 or the micro-pump unit 300 may release the prescribed medication for ingestion. The patient may clean the COPA device 100 and dock the COPA device 100 at the docking station 400 after use.

The patient and/or the authorized care giver may have access to an online COPA account, for example, hosted on the management system 950 via the network 940. The transceiver 420 may detect and transmit data such as activities recorded by the mouthpiece (e.g., dispensing dosages and timings for each medication) to the management system 950. The patient may view records of medications loaded into each chamber 322 of the COPA device 100 and/or the reservoir(s) of the docking station 400. The patient may view records of the administration path of medications filled in the COPA device 100 and/or the docking station 400 including the initial prescription and any subsequent revisions. The patient may view records of anticipated depletion timeline for the patient to pick up a second pre-filled COPA device and/or the docking station 400 and drop off the depleted COPA device and/or the docking station 400 if the treatment is a recurring treatment.

In an embodiment, the refill process for the COPA device 100 and/or the docking station 400 may use similar policies as today's drug refill policies. The COPA device 100 and/or the docking station 400 may be used in prolonged treatment plans. A prescribing doctor 910 may adjust and revise the prescription based on the treatment results observed from the patient. The doctor 910 may electronically transfer the revised prescription to the pharmacy 920. The pharmacy staff or the fulfillment technician may send revised instructions to the processor 310 wirelessly through the transceiver 420 of the docking station 400. The management system 950 may house a full record of all revisions. When the intended recipient has depleted the substance(s) in the COPA device 100 as planned, or as revised, the COPA device 100 may be returned to the docking station 400 and/or the pharmacy 920 for refills, for example, as directed by the prescribing doctor 910. The docking station 400 or pharmacy staff may remove any unwanted substance(s) remaining in the device. For example, the pharmacy staff may flush saline solution into the COPA device 100 through the access ports 122 into the sealed prescription dispensing unit 120 and out the exit valves 222. The docking station 400 may use a similar emptying approach or, in some instances, the docking station may remove any remaining substance(s) to a discard reservoir of the docking station 400 that can be subsequently emptied and discarded in a safe, appropriate manner by the pharmacy. After emptying any unwanted substance(s) from the COPA device 100, the docking station 400 or pharmacy staff may refill the COPA device 100 based on the order received from the doctor 910 and may update the record in the management system 950. For example, if a prescription is written for three refills, the record would indicate three dosage IDs in association with the ID of the processor 310 of the COPA device 100 and previous dosage IDs. By recording all information associated with the COPA device 100 and/or the docking station 400, the patient and the dosage information in the management system 950 may be retrieved at any time, including when the patient changes providers or pharmacies during a treatment plan.

In an embodiment, when the COPA device 100 and/or docking station 400 are no longer needed, for example, at the end of a treatment plan or change of treatment plan, the COPA device 100 and/or the docking station 400 may be deactivated and the management system 950 may be updated to indicate the deactivation. In some embodiments, when deactivation time of the COPA device 100 and/or the docking station 400 is within a certain time limit, for example, X number of months, an assembly technician may reuse the original impression to build a new COPA device 100 and/or reauthorize use of the docking station 400. The ID of the processor 310 within the new COPA device 100 may be stored in the management system 950 in association with the old ID of the old COPA device 100. In an embodiment, when a COPA device 100 needs to be recast due to actual change in the dentition of a recipient, the creation and preparation processes described above may be repeated. Information associated with the new mold may be stored on the management system 950 in association with the patient and the prescribed medications. By tracking all COPA devices 100 and/or docking stations 400 associated with a particular patient or a particular prescription, it will be rare for an unintended user to gain access to the prescribed medications or for an intended user to provide false information for misuse of a prescribed substance.

The following table lists reference numerals and corresponding reference names:

TABLE 1

Reference Numerals and Corresponding Reference Names.

| Reference Numerals | Reference Names |
|---|---|
| 100 | COPA device |
| 102 | top side |
| 104 | bottom side |
| 110 | recess |
| 112 | sensors |
| 114 | compartment |
| 116 | filament |
| 120 | prescription dispensing unit |
| 122 | access ports |
| 124 | sleeve |
| 210 | recess |
| 212 | sensors |
| 222 | exit valves |
| 300 | micro-pump unit |
| 310 | processor |
| 320 | reservoir |
| 322 | chambers |
| 330 | actuator |
| 340 | exit valves |
| 350 | flow channels |
| 360 | component |
| 370 | memory |
| 380 | transceiver |
| 400 | docking station |
| 410 | docking compartment |
| 420 | transceiver |

TABLE 1-continued

| Reference Numerals and Corresponding Reference Names. | |
|---|---|
| Reference Numerals | Reference Names |
| 430 | charging component |
| 440 | status indicators |
| 450 | COPA device sensing component |
| 460 | dispensing unit |
| 462 | reservoir |
| 464 | inlet |
| 466 | actuator |
| 468 | outlet |
| 470 | identification unit |
| 480 | processing system |
| 710 | wire |
| 720 | prescribed substance |
| 730 | access cannulas |
| 740 | exit cannulas |
| 900 | system |
| 910 | doctor |
| 920 | pharmacy |
| 930 | patient/authorized caregiver portal |
| 940 | network |
| 950 | COPA management system |

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An apparatus comprising:

a dispensing unit configured to dispense a substance into a reservoir associated with a mouthpiece of an intended user, wherein the dispensing unit includes a housing configured to removably receive the mouthpiece and the reservoir, the housing sized and shaped to receive at least a portion of the mouthpiece, wherein the housing includes a compartment sized and shaped to receive at least a portion of the reservoir within the compartment; and an identification unit configured to, based on a communication from the mouthpiece, determine an identity of the intended user when the mouthpiece of the intended user is coupled to a housing, wherein the housing comprises a charging component, and wherein when the mouthpiece is coupled to the housing, the charging component of the housing is coupled to a charging component of the mouthpiece, wherein the charging component of the housing is configured to charge the mouthpiece via a wireless connection.

2. The apparatus of claim 1, wherein the dispensing unit includes:

a holding reservoir containing the substance; and an actuator in communication with the holding reservoir, the actuator configured to move the substance from the holding reservoir to the reservoir associated with the mouthpiece.

3. The apparatus of claim 2, wherein the holding reservoir has a volume at least two times greater than a volume of the reservoir associated with the mouthpiece.

4. The apparatus of claim 2, wherein the dispensing unit further includes:

a second holding reservoir containing a second substance; and a second actuator in communication with the second holding reservoir, the second actuator configured to move the second substance from the second holding reservoir of the dispensing unit to a second reservoir associated with the mouthpiece.

5. The apparatus of claim 4, wherein the dispensing unit further includes:

a third holding reservoir containing a third substance; and a third actuator in communication with the third holding reservoir, the third actuator configured to move the third substance from the third holding reservoir to a third reservoir associated with the mouthpiece.

6. The apparatus of claim 5, wherein the second substance is different than the substance.

7. The apparatus of claim 5, wherein the third substance is different than the second substance.

8. The apparatus of claim 2, wherein the dispensing unit further includes a second holding reservoir containing a second substance, and wherein the actuator is in communication with the second holding reservoir and is further configured to move the second substance from the second holding reservoir to a second reservoir associated with the mouthpiece.

9. The apparatus of claim 2, wherein the dispensing unit further includes an outlet in communication with the actuator, wherein the outlet is configured to engage with an inlet of the mouthpiece.

10. The apparatus of claim 9, wherein the actuator is configured to move the substance from the holding reservoir to the reservoir associated with the mouthpiece via the outlet of the dispensing unit.

11. The apparatus of claim 2, wherein the dispensing unit further includes an inlet in communication with the holding reservoir, and wherein the holding reservoir is configured to receive the substance via the inlet.

* * * * *